(12) United States Patent
Kobayashi et al.

(10) Patent No.: US 7,729,024 B2
(45) Date of Patent: Jun. 1, 2010

(54) COLOR DRIFT ERROR CORRECTING METHOD AND IMAGE FORMING APPARATUS

(75) Inventors: Kazuhiko Kobayashi, Tokyo (JP); Joh Ebara, Kanagawa (JP); Yasuhisa Ehara, Kanagawa (JP); Noriaki Funamoto, Tokyo (JP); Toshiyuki Uchida, Kanagawa (JP); Seiichi Handa, Tokyo (JP); Yuji Matsuda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 831 days.

(21) Appl. No.: 11/542,123

(22) Filed: Oct. 4, 2006

(65) Prior Publication Data

US 2007/0097465 A1 May 3, 2007

(30) Foreign Application Priority Data

| Oct. 31, 2005 | (JP) | ............................. 2005-317789 |
| Nov. 30, 2005 | (JP) | ............................. 2005-345771 |
| May 31, 2006 | (JP) | ............................. 2006-152524 |

(51) Int. Cl.
*H04N 1/58* (2006.01)
*H04N 1/60* (2006.01)

(52) U.S. Cl. ........................ 358/526; 358/3.26; 382/275

(58) Field of Classification Search .................. 358/1.9, 358/504, 518, 1.4, 3.26, 500, 526, 530, 400, 358/305; 359/204.1; 382/154, 275, 287; *H04N 1/58, H04N 1/60*
See application file for complete search history.

(56) References Cited

U.S. PATENT DOCUMENTS

| 6,167,221 | A | 12/2000 | Kobayashi |
| 6,198,896 | B1 * | 3/2001 | Nakayasu et al. ........... 399/301 |
| 6,708,017 | B2 | 3/2004 | Yamanaka et al. |
| 6,725,991 | B2 | 4/2004 | Murano et al. |
| 6,889,022 | B2 | 5/2005 | Ehara et al. |
| 6,889,029 | B2 | 5/2005 | Yamanaka et al. |

(Continued)

FOREIGN PATENT DOCUMENTS

EP 1 369 749 A2 12/2003

(Continued)

OTHER PUBLICATIONS

U.S. Appl. No. 11/867,426, filed Oct. 4, 2007, Kobayashi, et al.

*Primary Examiner*—James A Thompson
(74) *Attorney, Agent, or Firm*—Oblon, Spivak, McClelland, Maier & Neustadt, L.L.P.

(57) ABSTRACT

A color-drift correcting method in an image forming apparatus includes a first and a second color-drift correcting. The first color-drift correcting includes correcting the color-drift amount in a sub scanning direction and a skew relative to the reference color image being based on each color-drift amount of at least three mark-patterns, each of which mark-pattern is formed each color image, so as to decide a corrected-image line as a virtual image line for each color, assumed when the color images are superposed onto a transfer media. A second color-drift correcting includes correcting the color-drift amount in the sub scanning direction so that the virtual image lines corresponding to each of the colors other than the reference color intersect with the virtual image line of the reference color at at least two points.

13 Claims, 29 Drawing Sheets

U.S. PATENT DOCUMENTS

| | | |
|---|---|---|
| 6,898,400 B2 | 5/2005 | Ehara |
| 6,920,303 B2 | 7/2005 | Yamanaka et al. |
| 6,934,498 B2 | 8/2005 | Kobayashi et al. |
| 6,949,896 B2 | 9/2005 | Andoh et al. |
| 6,952,557 B2 | 10/2005 | Kobayashi |
| 6,999,713 B2 | 2/2006 | Kobayashi |
| 2003/0223784 A1 | 12/2003 | Yamanaka et al. |
| 2004/0036936 A1* | 2/2004 | Nakajima et al. ............ 359/204 |
| 2004/0126129 A1 | 7/2004 | Kobayashi |
| 2004/0126137 A1 | 7/2004 | Ehara |
| 2005/0031361 A1 | 2/2005 | Kobayashi |
| 2005/0053388 A1 | 3/2005 | Yokoyama et al. |
| 2005/0058470 A1 | 3/2005 | Funamoto et al. |
| 2005/0084293 A1 | 4/2005 | Fukuchi et al. |
| 2005/0207799 A1 | 9/2005 | Ebara |
| 2006/0039722 A1 | 2/2006 | Ehara |
| 2006/0056868 A1 | 3/2006 | Ebara et al. |
| 2006/0110189 A1 | 5/2006 | Matsuda et al. |
| 2006/0133873 A1 | 6/2006 | Andoh et al. |
| 2006/0165442 A1 | 7/2006 | Kobayashi et al. |
| 2006/0177246 A1* | 8/2006 | Kawada et al. ............... 399/301 |
| 2006/0182465 A1 | 8/2006 | Funamoto et al. |
| 2006/0182471 A1 | 8/2006 | Okamura et al. |
| 2008/0226361 A1* | 9/2008 | Tomita et al. ................ 399/301 |
| 2008/0304840 A1* | 12/2008 | Ikeda .......................... 399/39 |

FOREIGN PATENT DOCUMENTS

| | | |
|---|---|---|
| EP | 1 496 406 A1 | 1/2005 |
| EP | 1 575 258 A2 | 9/2005 |
| JP | 1-142671 | 6/1989 |
| JP | 2740256 | 1/1998 |
| JP | 2001-142671 | 5/2001 |
| JP | 3351435 | 9/2002 |

* cited by examiner

COLOR DRIFT ERROR CORRECTING METHOD AND IMAGE FORMING APPARATUS

CROSS-REFERENCE TO RELATED APPLICATIONS

The present document incorporates by reference the entire contents of Japanese priority documents, 2005-317789 filed in Japan on Oct. 31, 2005 and 2005-345771 filed in Japan on Nov. 30, 2005 and 2006-152524 filed in Japan on May 31, 2006.

BACKGROUND OF THE INVENTION

1. Field of the Invention

The present invention relates to a color-drift-error correcting method by controlling respectively different color-image forming operations so as to minimize a color-drift error. The present invention also relates to an image forming apparatus such as copying machines, printers, facsimile machines, complex machines and the like, being provided with a controlling unit that controls respectively different color image forming units so as to minimize the color-drift error.

2. Description of the Related Art

In the field of color image forming apparatus, there has been known a tandem-type image forming apparatus for forming a color image, having a plurality of image carriers such as photoconductors arranged along an endless transfer belt, which is a transfer medium. In the tandem-type image forming apparatus, an electro-photographic process such as development is performed while an electrostatic lateral image is formed for each of yellow (Y), magenta (M), cyan (C), and black (K) on a respective image carrier. These images of different colors on the respective image carriers are superposed one another to finally form a color image on a transfer sheet. In the tandem-type color image forming apparatus, it is necessary to accurately position toner transfers of different color toner images to form a high quality image. If there is a positional drift between different color toner images, a high quality color image will not be obtained due to color drift between superposed toner images formed on the transfer sheet.

FIG. 22 is a view for explaining color drift in a vertical scanning direction. FIG. 23 is a view for explaining a skew drift. As such color drift, vertical (sub scanning direction) scanning registration drift which is deviation in the vertical scanning direction from an ideal image formation line (position at which toner image is to be properly formed) indicated by the bold line in FIG. 22, and skew drift, which is inclination in the vertical scanning direction from an ideal image formation line indicated by the bold line in FIG. 23, are exemplified. In view of the above, an apparatus has been proposed in which after forming a mark-pattern for positioning, the position of the mark-pattern is detected by a sensor, and being based on the detection result, the position is corrected by matching drifted image formation line with the ideal image formation line. That is written for example in Japanese Patent application Laid-open No. 1-142671 and JP Patent No. 33514352.

In the patent document mentioned above it is written that a mark-pattern is formed on each end of an intermediate transfer belt. Each mark-pattern includes a series of mark images of different colors of toner arranged in a moving direction of the belt. Each of these mark images of each mark-pattern is detected by a sensor, and a drift amount between the detected position and an ideal position is calculated, and a toner transfer position is corrected.

FIG. 25 is a view for explaining an amount of color drift compared to the ideal image after the color drift is corrected based on the former art. Due to positioning errors of lens, mirror and the like optical devices in an optical writing device, or due to relative positioning errors between an image carrier and an optical writing device, a trajectory of scanning line of laser beam sometimes curves. In such a case, an image formation line in the horizontal scanning direction (main scanning direction) curves like an arch as shown in FIGS. 24A and 24B. In the methods disclosed in the patent documents mentioned above, mark-patterns are formed on both ends of an intermediate transfer belt, and position correction is conducted such that both ends of an image formation line match with the ideal image formation line. Therefore, when the image formation line in the horizontal scanning direction curves in the vertical scanning direction as described above, the middle part of the image formation line after correction will be largely deviated from the ideal image formation line indicated by the bold line in the drawing as shown in FIG. 25. As a result, color drift occurs-in the middle part in the horizontal scanning direction of image, and a high quality color image is-not obtained.

SUMMARY OF THE INVENTION

It is an object of the present invention to at least partially solve the problems in the conventional technology.

According to one aspect of the present invention, a color-drift correcting method of forming a plurality of images of different colors and superposing the images onto a transfer medium includes forming at least three mark-patterns at respectively different portion on the transfer medium in a main scanning direction, each mark-pattern including a plurality of images of different colors, the colors including one reference color; detecting positions of the images in the mark-patterns; calculating, for each mark-pattern, each color-drift amount of the images in the corresponding mark-pattern relative to a reference color image in the corresponding mark-pattern when each color image is assumed to be superposed on the transfer medium; first color-drift correcting that corrects the color-drift amount in a sub scanning direction and a skew relative to the reference color image being based on each color-drift amount so as to decide a corrected-image line as a virtual image line for each color; and second color-drift correcting that corrects the color-drift amount in the sub scanning direction so that the virtual image lines corresponding to each of the colors other than the reference color intersect with the virtual image line of the reference color at at least two points.

According to another aspect of the present invention, an image forming apparatus of forming a plurality of images of different colors and superposing the images onto a transfer medium includes at least three mark-pattern forming unit at respectively different portion on the transfer medium in a main scanning direction, each mark-pattern including a plurality of images of different colors, the colors including one reference color; a detecting unit that detects positions of the images in the mark-patterns; a calculating unit that calculates, for each mark-pattern, each color-drift amount of the images in the corresponding mark-pattern relative to a reference color in the corresponding mark-pattern when each color image is assumed to be superposed on the transfer medium; and a controller that performs first color-drift correcting that corrects the color-drift amount in a sub scanning direction and a skew relative to the reference color image being based on each color-drift amount so as to decide a corrected-image line as a virtual image line for each color; and second color-drift correcting that corrects the color-drift amount in the sub scanning direction so that the virtual image lines corresponding to each of the colors other than the reference color intersect with the virtual image line of the reference color at at least two points.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

In the following, one embodiment of the present invention that is applied to an image forming apparatus, i.e., a printer (hereinafter, "first embodiment") will be explained. The first embodiment will be explained while taking a tandem-type image forming apparatus based on a so-called intermediate transfer method as an example in a non-limitative way.

Figure 1:
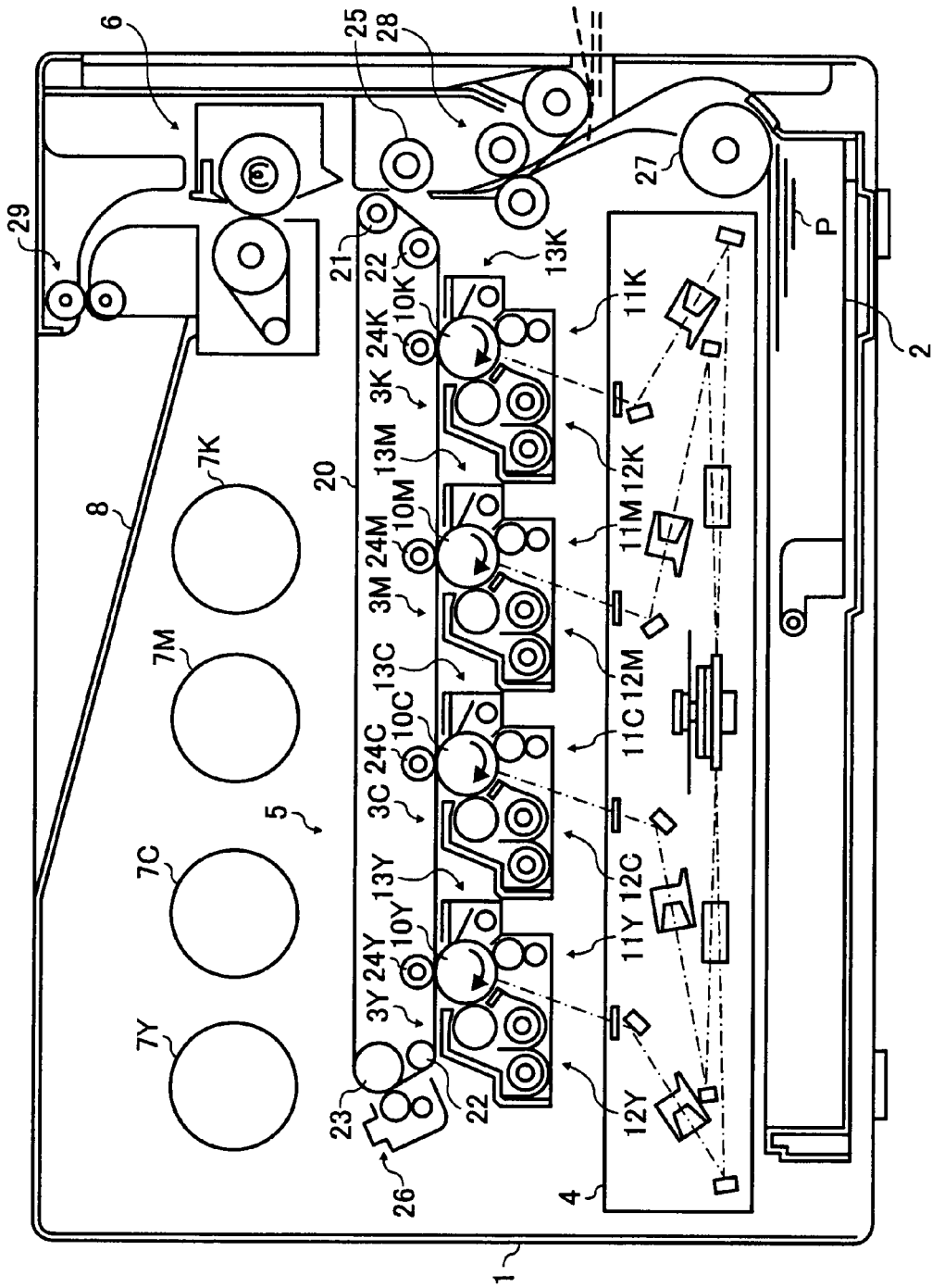
FIG. 1 is a schematic view of a printer according to an embodiment of the present invention.

FIG. 1 is a schematic view of a printer according to an embodiment of the present invention.

The printer includes an apparatus main body 1 and a sheet feeding cassette 2 which can be drawn from the apparatus main body 1. In a center part of the apparatus main body 1, there are provided image forming stations 3Y, 3C, 3M, and 3K for forming toner images (visible images) in yellow (Y), cyan (C), magenta (M), and black (K). Hereinafter, the subscripts Y, C, M, and K in any reference numerals represent members for yellow, cyan, magenta, and black, respectively.

Figure 2:
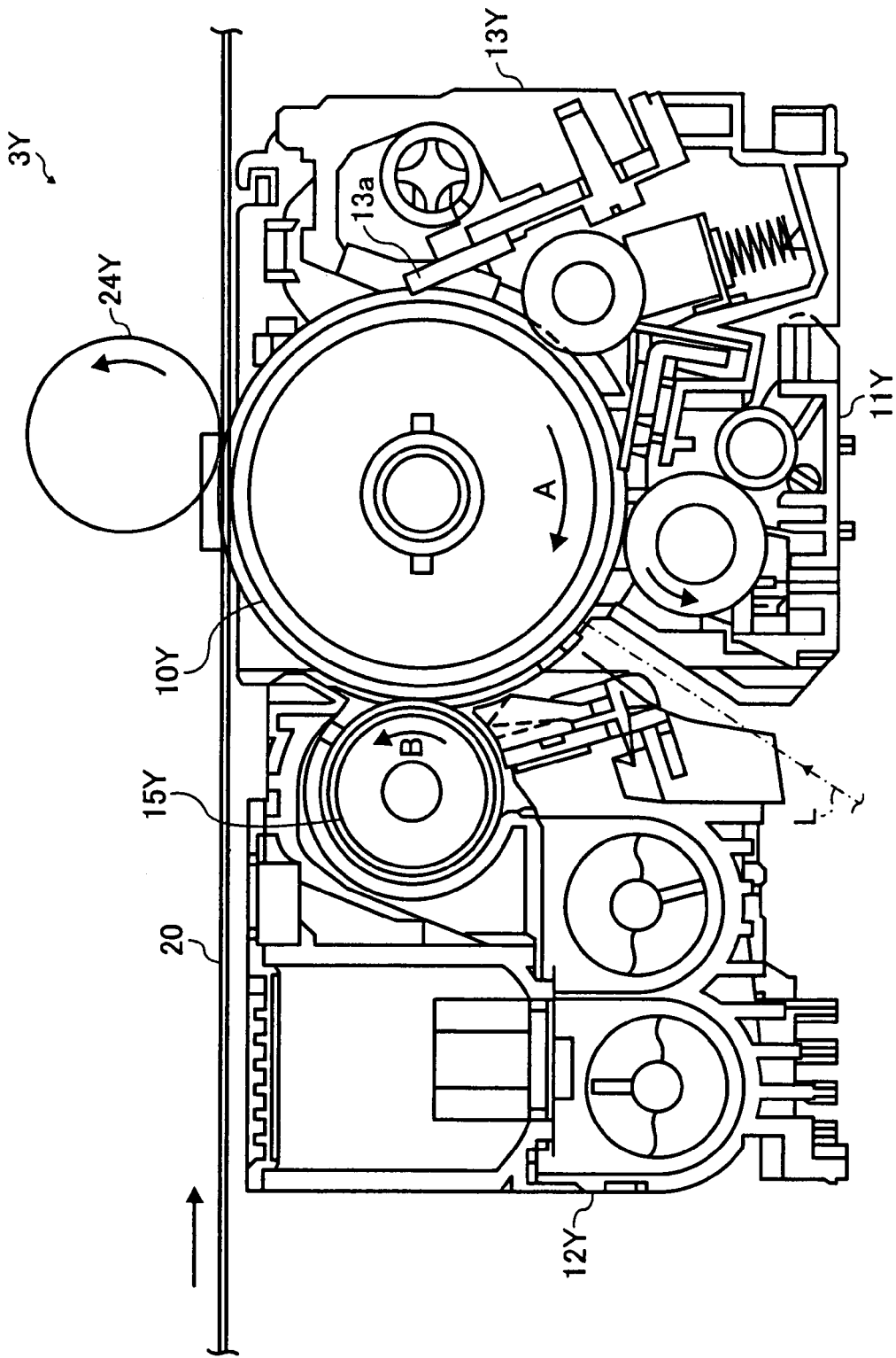
FIG. 2 is a structural view of an image forming station of the printer.

FIG. 2 is a structural view of an image forming station of the printer. Other image forming stations have similar structures.

As shown in FIGS. 1 and 2, the image forming stations 3Y, 3C, 3M, and 3K have photoconductors 10Y, 10C, 10M, and 10K of drum forms serving as latent image carriers that rotate in the direction of arrow A in the drawing. Each of the photoconductors 10Y, 10C, 10M, and 10K is formed of an aluminum cylindrical base having a diameter of 40 millimeters and a photoconductive layer of e.g., organic photo semiconductor (OPC) covering the surface of the base. The image forming stations 3Y, 3C, 3M, and 3K, respectively have around the photoconductors 10Y, 10C, 10M, and 10K, charging devices 11Y, 11c, 11M, and 11K that charge the photoconductors, developing devices 12Y, 12C, 12M, and 12K serving as developing units that develop latent images formed on the photoconductors, and cleaning devices 13Y, 13C, 13M, and 13K that clean remaining toner on the photoconductors. Under the image forming stations 3Y, 3C, 3M, and 3K, there is an optical writing unit 4 serving as optical writing unit which is an optical scanner capable of emitting an optical writing beam L to the photoconductors 10Y, 10C, 10M, and 10K. Above the image forming stations 3Y, 3C, 3M, and 3K, also provided is an intermediate transfer unit 5 having an intermediate transfer belt 20 to which toner images formed by the image forming stations 3Y, 3C, 3M, and 3K are to be transferred. Also provided is a fixing unit 6 that fixes the toner images transferred to the intermediate transfer belt 20 onto a transfer sheet P which is a recording material. In an upper part of the apparatus main body 1, toner bottles 7Y, 7C, 7M, and 7K that accommodate toner of yellow (Y), cyan (C), magenta (M), and black (K) are attached. These toner bottles 7Y, 7C, 7M, and 7K can be detached from the apparatus main body 1 by opening a sheet discharge tray 8 provided in an upper part of the apparatus main body 1.

The optical writing unit 4 sequentially scans the photoconductors 10Y, 10C, 10M, and 10K by irradiating them with a writing beam (laser beam) L emitted from a laser diode which is an optical source and having deviated by a polygon mirror or the like. The details of the optical writing unit 4 will be described later.

The intermediate transfer belt 20 of the intermediate transfer unit 5 is bridged around a driving roller 21, a tension roller 22, and a driven roller 23, and driven to rotate counterclockwise in the drawing in a predetermined timing. The intermediate transfer unit 5 has primary transfer rollers 24Y, 24C, 24M, and 24K that transfer toner images formed on the photoconductors 10Y, 10C, 10M, and 10K to the intermediate transfer belt 20. The intermediate transfer unit 5 has a secondary transfer roller 25 that transfers the toner image transferred to the intermediate transfer belt 20 to a transfer sheet P, and a belt cleaning device 26 that cleans transfer remaining toner on the intermediate transfer belt 20 that is not transferred to the transfer sheet P.

Next, a process of obtaining a color image in the printer of the structure will be explained.

First, in the image forming stations 3Y, 3C, 3M, and 3K, the photoconductors 10Y, 10C, 10M, and 10K are uniformly charged by the charging devices 11Y, 11C, 11M, and 11K. Then a laser beam L is exposed for scanning by the optical writing unit 4 according to image information, and lateral images are formed on the surfaces of the photoconductors 10Y, 10C, 10M, and 10K. Then the lateral images on the photoconductors 10Y, 10C, 10M, and 10K are developed with toner of respective colors carried on developing rollers 15Y, 15C, 15M, and 15K of the developing devices 12Y, 12C, 12M, and 12K and visualized as toner images. The toner images on the photoconductors 10Y, 10C, 10M, and 10K are sequentially transferred so that they are superposed on the intermediate transfer belt 20 rotating counterclockwise, under action of the respective primary transfer rollers 24Y, 24C, 24M, and 24K. At this time, the image forming action of each color is executed while shifting the timing from upstream to downstream in the traveling direction of the intermediate transfer belt 20 so that these toner images may be transferred and superposed at the same position on the intermediate transfer belt 20. Surfaces of the photoconductors 10Y, 10C, 10M, and 10K after completion of primary transfer are cleaned by a cleaning blade 13a of the cleaning devices 13Y, 13C, 13M, and 13K, and brought into ready for the next image formation. The toner packed in the toner bottles 7Y, 7C, 7M, and 7K are supplied in appropriate amounts to the developing devices 12Y, 12C, 12M, and 12K of the respective image forming stations 3Y, 3C, 3M, and 3K as necessary via a conveyance path (not shown).

On the other hand, a transfer sheet P in the sheet feeding cassette 2 is conveyed into the apparatus main body 1 by a sheet feeding roller 27 provided in the vicinity of the sheet feeding cassette 2, and conveyed in predetermined timing to the secondary transfer part by a pair of registration rollers 28. Then in the secondary transfer part, the toner images formed on the intermediate transfer belt 20 are transferred to the transfer sheet P. The transfer sheet P thus bearing the toner image transferred thereon undergoes image fixation during passage through the fixing unit 6, and then discharged to the sheet discharge tray 8 by a discharging roller 29. Likewise the case of a photoconductor 10, transfer remaining toner remaining on the intermediate transfer belt 20 is cleaned by the belt cleaning device 26 which contacts the intermediate transfer belt 20.

Next, a structure of the optical writing unit 4 will be explained.

Figure 3:
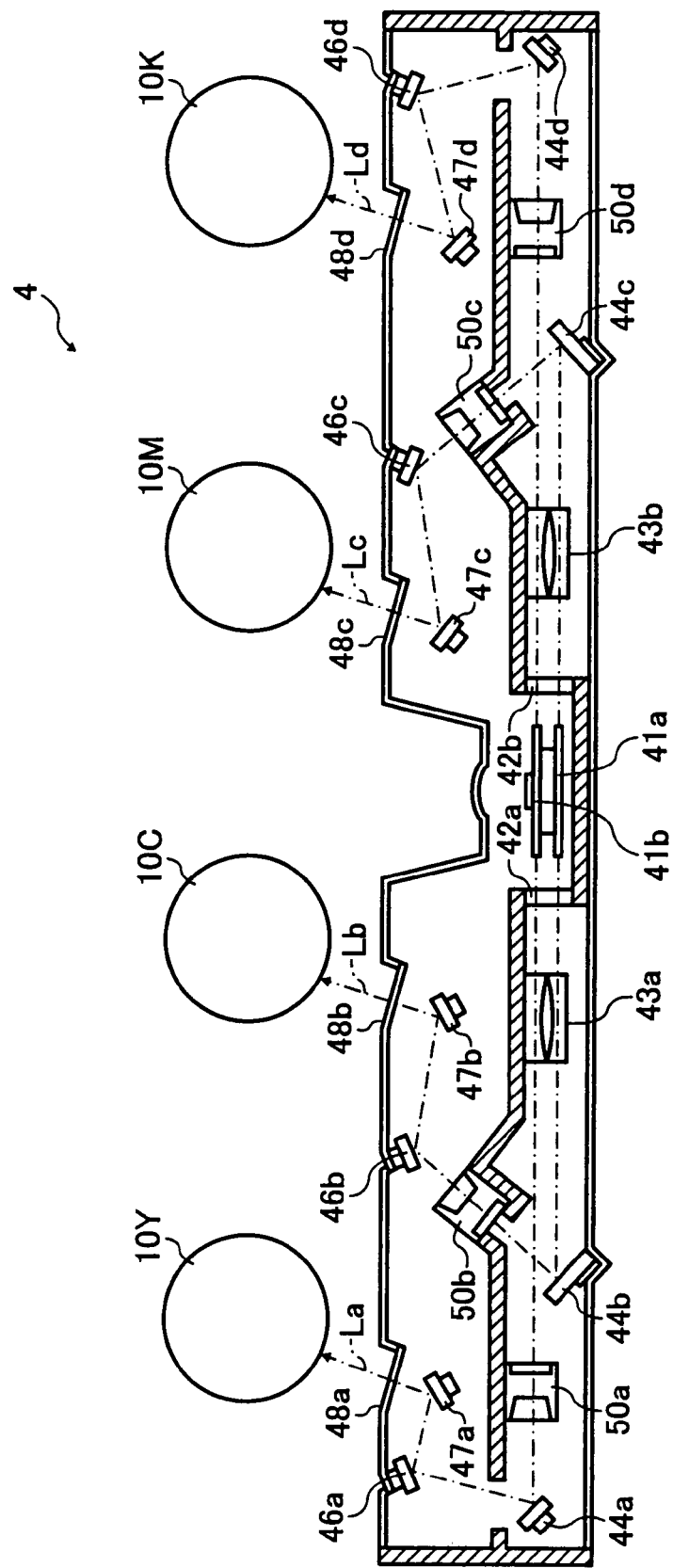
FIG. 3 is a view for explaining a structure of an optical writing unit.

FIG. 3 is a view for explaining a structure of an optical writing unit.

The optical writing unit 4 includes two polygon mirrors 41a and 41b in the shape of a regular polygonal column. The polygon mirror 41a and 41b has a reflection mirror on its lateral face, and rotates at a high velocity about the center axis of the regular polygonal column as a center of rotation by means of a polygon motor (not shown). When a writing beam (laser beam) emitted from a laser diode (optical source, not shown) enters the lateral face, the laser beam is deflected and scanned. The optical writing unit 4 also includes sound proof glasses 42a and 42b for achieving noise insulation effect of polygon motor, fθ lenses 43a and 43b that convert isometric motion of laser scanning to uniform linear motion by the polygon mirrors 41a and 41b, mirrors 44a, 44b, 44c, 44d, 46a, 46b, 46c, 46d, 47a, 47b, 47c, and 47d that guide a laser beam to the photoconductors 10Y, 10C, 10M, and 10K, lengthy lens units 50a, 50b, 50c, and 50d serving as adjustable members for correcting face tangle error of polygon mirror, and anti-dust glasses 48a, 48b, 48c, and 48d that prevent dust and the like from dropping into the housing. In FIGS. 3, the numerals La, Lb, Lc, and Ld respectively indicate optical paths of writing beams emitted to the photoconductors 10Y, 10C, 10M, and 10K.

The optical writing unit has an adjusting device that adjusts curve and inclination of a scanning line. Inclination of the scanning line is adjusted by changing positions of the lengthy lens units 50a, 50b, 50c, and 50d which are optical devices. The mechanism by which inclination of scanning line is adjusted is provided in the lengthy lens units 50a, 50b, and 50c corresponding to the photoconductors 10Y, 10C, and 10M for yellow (Y), cyan (C), and magenta (M), but not in the lengthy lens unit 50d for black (K). This is because curves and inclinations of scanning lines of colors Y, C, and M are adjusted based on the curve and inclination of color K. In the following, explanation will be made while taking the lengthy lens unit 50a corresponding to the photoconductor 10Y for yellow (Y) as an example. In the following explanation, subscripts for representing color will be omitted.

Figure 4A:
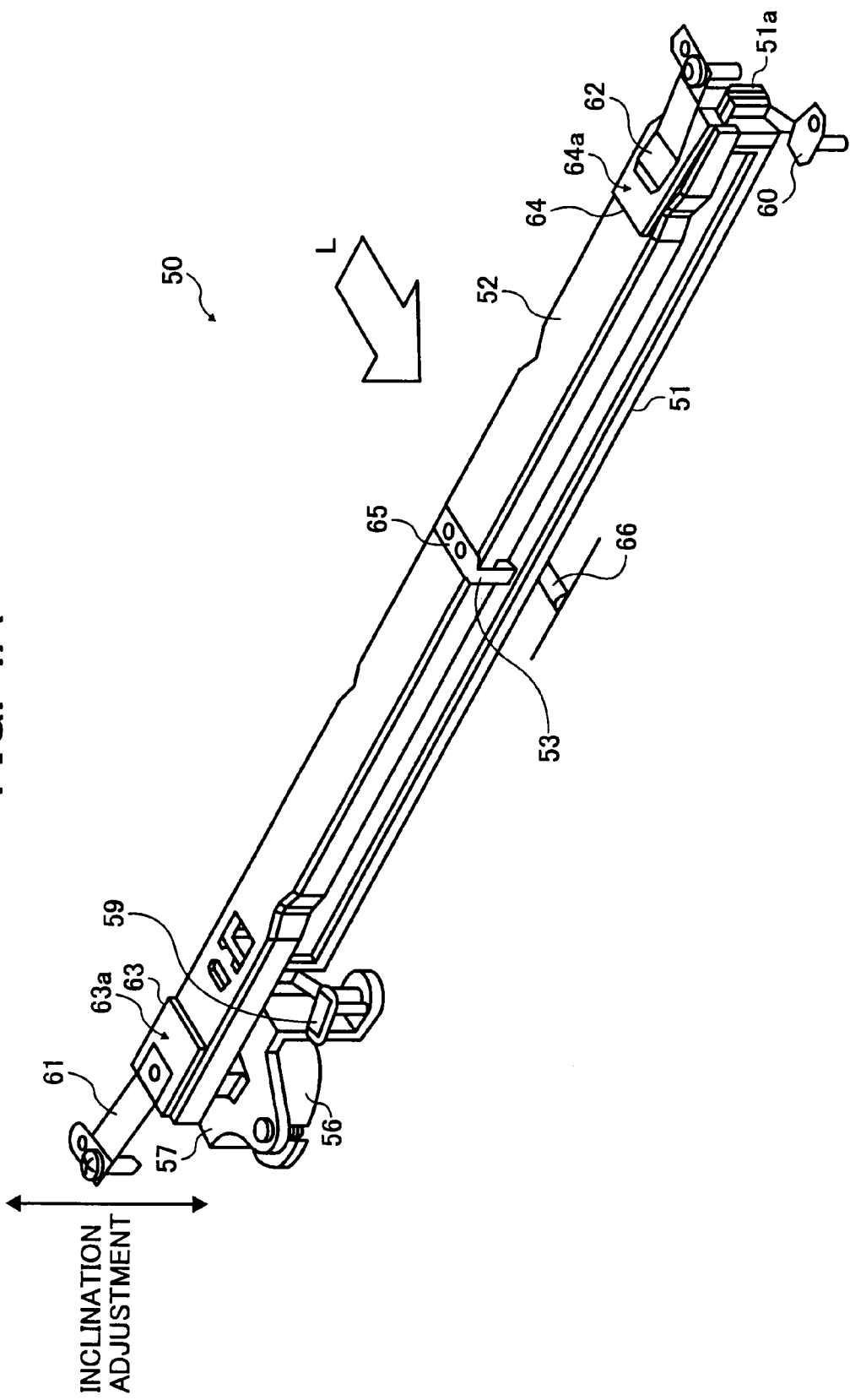
FIG. 4A is a perspective view of a lengthy lens unit mounted in the optical writing unit.
Figure 4B:
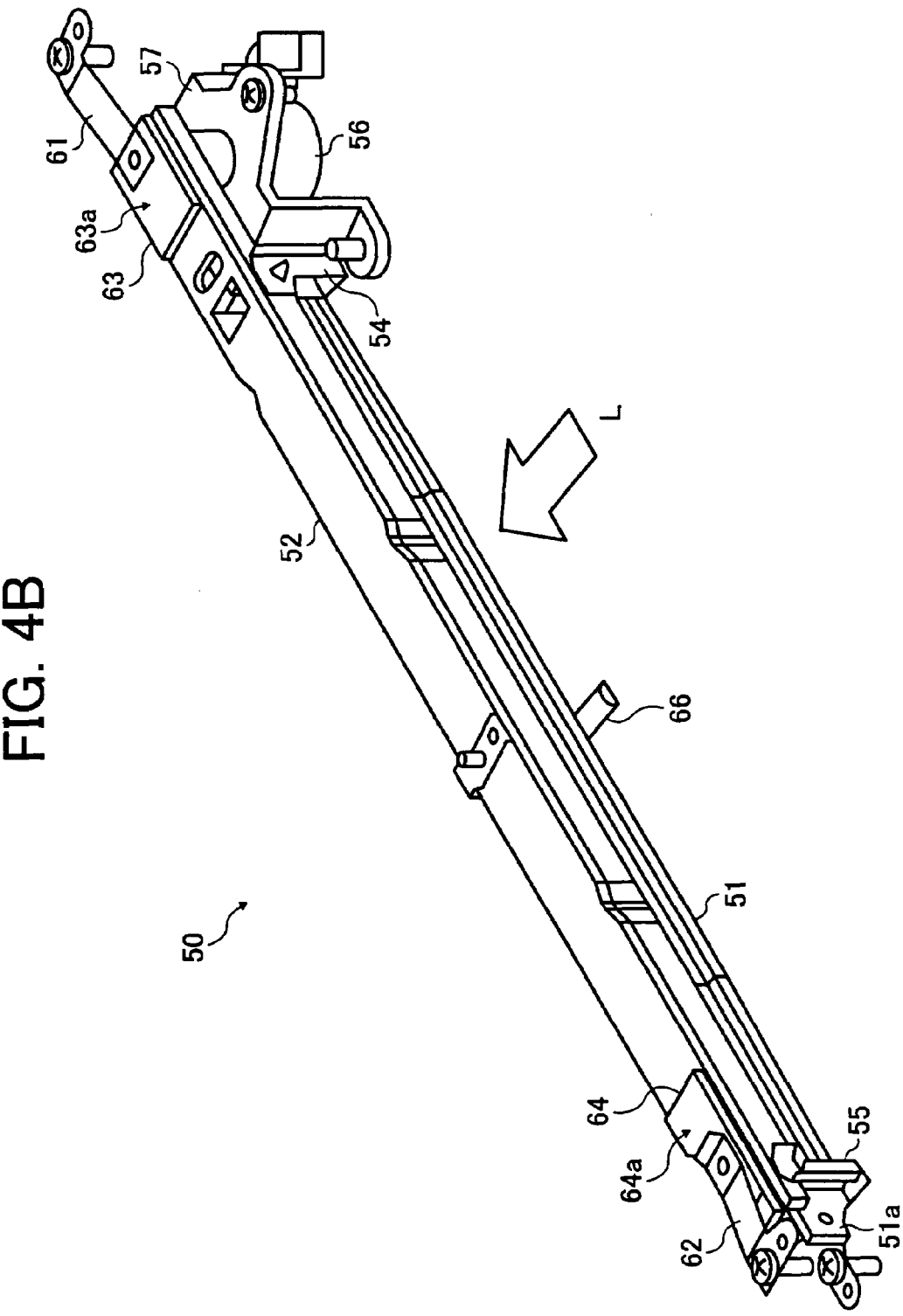
FIG. 4B is the perspective view of the lengthy lens unit mounted in the optical writing unit.

FIGS. 4A and 4B are perspective views of the lengthy lens unit 50.

The lengthy lens unit 50 has a lengthy lens 51 that corrects face tangle errors of the polygon mirrors 41a and 41b, a bracket 52 that holds the lengthy lens 51, a curve adjusting plate spring 53, securing plate springs 54 and 55 for securing the lengthy lens 51 and the bracket 52, a driving motor 56 for automatically adjusting inclination of scanning line, a driving motor holder 57, a screw receiver 58, a housing securing member, unit supporting plate springs 60, 61, and 62, smooth surface members 63 and 64 serving as a friction coefficient reducing unit, a curve adjusting screw 65 and so on.

FIG. 4A is a perspective view of a lengthy lens unit mounted in the optical writing unit. FIG. 4B is the perspective view of the lengthy lens unit mounted in the optical writing unit. For adjusting inclination of scanning line, a rotation angle of the driving motor 56 is controlled based on a skew amount calculated by control of correction of positional drift as will be described later. As a result, a lifting screw attached to the rotation axis of the driving motor 56 moves up and down and an end of the lengthy lens unit 50 on the side of the motor moves in the direction of the arrow in the drawing. To be more specific, when the lifting screw moves up, the end on the side of the motor of the lengthy lens unit 50 rises against the force applied by the unit supporting plate spring 61. As a result, the lengthy lens unit 50 swivels clockwise in FIG. 1 about a supporting base 66, and thus changes its position. On the other hand, when the lifting screw moves down, the end on the side of the motor of the lengthy lens unit 50 moves down by the help of the force applied by the unit supporting plate spring 61. As a result, the lengthy lens unit 50 swivels counterclockwise in FIGS. 4A and 4B, supported on the supporting base 66, and thus-changes the position.

When the position of the lengthy lens unit 50 changes in the manner as described above, the position at which the laser beam L enters the entrance face of the lengthy lens 51 also changes. The lengthy lens 51 has such a characteristic that when the entrance position of the laser beam L on the entrance face of the lengthy lens 51 changes in the direction which is perpendicular to the longitudinal direction and the direction of optical path of the lengthy lens 51 (vertical direction), the angle relative to the vertical direction of the laser beam outgoing from the outgoing face of the lengthy lens 51 (outgoing angle) changes. Owing to this characteristic, when the position of the lengthy lens unit 50 changes by means of the lifting screw, the outgoing angle of the laser beam outgoing from the outgoing face of the lengthy lens 51 changes correspondingly, with the result that inclination of the scanning line on the photoconductor by this laser beam changes.

Next, control of correction of color drift will be explained.

Figure 5:
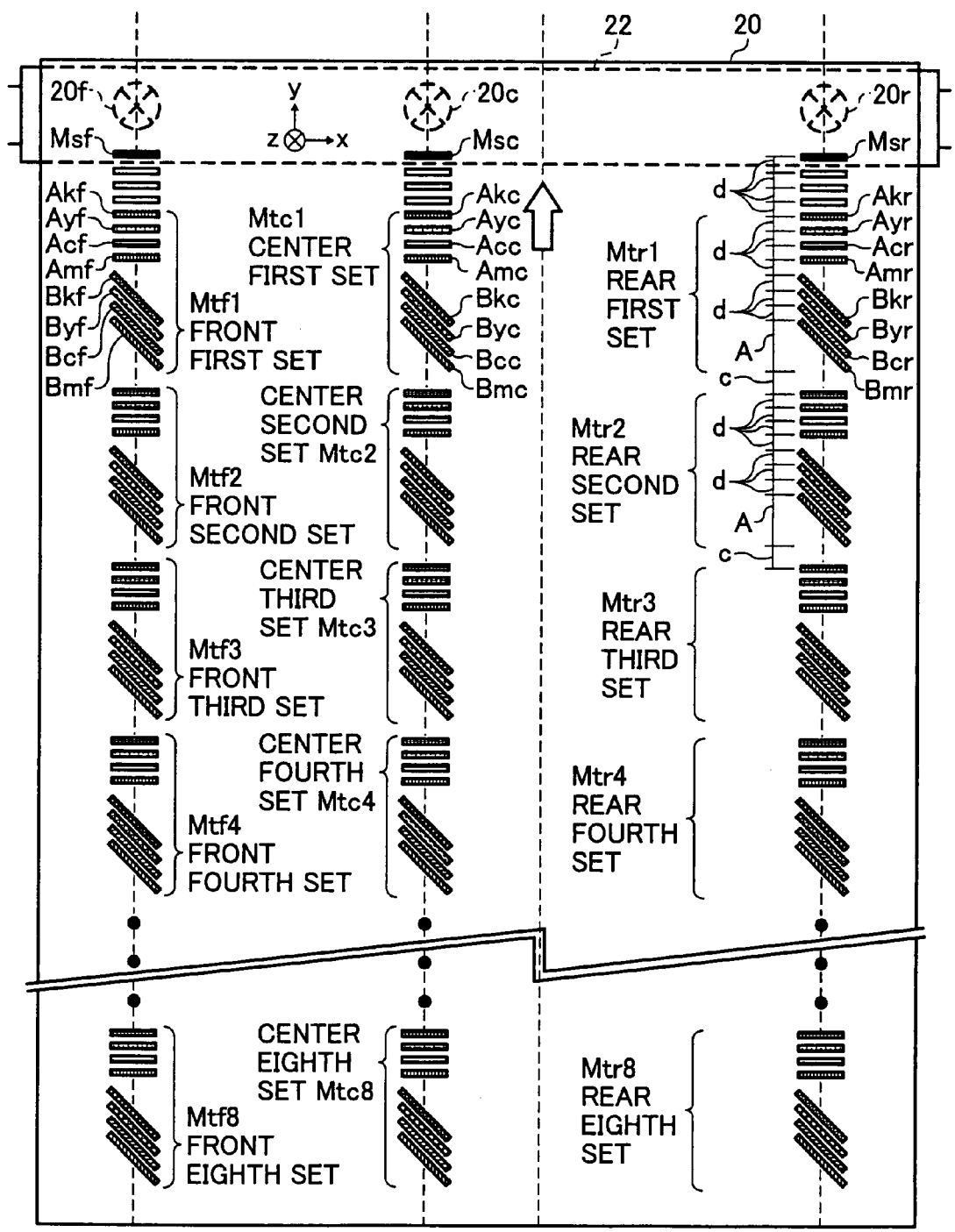
FIG. 5 is a view for explaining a group of mark-patterns formed on an intermediate transfer belt.

FIG. 5 is a view for explaining a group of mark-patterns formed on an intermediate transfer belt. As shown in FIG. 5, in conducting control of color drift correction, test patterns are formed on the intermediate transfer belt 20. Specifically, in a rear end part (rear) along the width direction x which is perpendicular to the traveling direction of the intermediate transfer belt 20, a start mark Msr of black (Bk) is formed followed by a space of four pitches 4$d$ of mark pitch d, and eight sets of mark sets Mtr1 to Mtr8 are sequentially formed within one-twentieths cycle of the intermediate transfer belt 20 at a set pitch (constant pitch) of 7$d$+A+c.

In this laser printer, as a rear side test pattern, a start mark Msr and eight sets of mark sets Mtr1 to Mtr8 are formed within one cycle of the rear of the inter mediate transfer belt 20, and the start mark Msr and the eight sets of mark sets Mtr1 to Mtr8 include a total of 65 marks.

The first mark set Mtr1 includes as a perpendicular mark group consisting of a group of marks which are parallel with the horizontal scanning direction x (width direction of the inter mediate transfer belt 20):

first perpendicular mark Akr of black (Bk);
second perpendicular mark Ayr of yellow (Y);
third perpendicular mark Acr of cyan (C); and
fourth perpendicular mark Amr of magenta (M), and as a diagonal mark group consisting of a group of marks which form an angle of 45 degrees with respect to the horizontal scanning direction x:

first diagonal mark Bkr of Bk;
second diagonal mark Byr of Y;
third diagonal mark Bcr of C; and
fourth diagonal mark Bmr of M.

The marks Akr to Amr, and Bkr to Bmr are arranged at a mark pitch d in the vertical scanning direction y (traveling direction of the intermediate transfer belt 20). The second to eighth mark sets Mtr2 to Mtr8 are identical to the first mark set Mtr1 and the mark sets Mtr1 to Mtr8 are arranged at a clearance c in the vertical scanning direction y (traveling direction of the intermediate transfer belt 20).

Likewise the above, in a front end part of the intermediate transfer belt 20, a start mark Msf of Bk is formed followed by a space of four pitches 4$d$ of mark pitch d, and eight sets of mark sets Mtf1 to Mtf8 are sequentially formed within one-twentieths cycle of the intermediate transfer belt 20 at a set pitch (constant pitch) of 7$d$+A+c.

In the laser printer of the present embodiment, as a front side test pattern, a start mark Msf and eight sets of mark sets Mtf1 to Mtf8 are formed within one cycle of the intermediate transfer belt 20, and the start mark Msf and the eight sets of mark sets Mtf1 to Mtf8 include a total of 65 marks.

The first mark set Mtr1 includes as a perpendicular mark group consisting of a group of marks which are parallel with the horizontal scanning direction x (width direction of the intermediate transfer belt 20):

first perpendicular mark Akf of Bk;
second perpendicular mark Ayf of Y;
third perpendicular mark Acf of C; and
fourth perpendicular mark Amf of M, and as-a diagonal mark group consisting of a group of marks which form an angle of 45 degrees with respect to the horizontal scanning direction x:

first diagonal mark Bkf of Bk;
second diagonal mark Byf of Y;
third diagonal mark Bcf of C; and
fourth diagonal mark Bmf of M.

The marks Akf to Amf, and Bkf to Bmf are arranged at a mark pitch d in the vertical scanning direction y (traveling direction of the intermediate transfer belt 20). The second to eighth mark sets Mtf2 to Mtf8 are identical to the first mark set Mtf1, and the mark sets Mtf1 to Mtf8 are arranged at a clearance c in the vertical scanning direction y.

Likewise the above, in a center part of the intermediate transfer belt 20, a start mark Msc of Bk is formed followed by a space of four pitches 4$d$ of mark pitch d, and eight sets of mark sets Mtc1 to Mtc8 are sequentially formed within one-twentieths cycle of the intermediate transfer belt 20 at a set pitch (constant pitch) of 7$d$+A+c.

In the laser printer of the present embodiment, as a front side test pattern, a start mark Msc and eight sets of mark sets Mtc1 to Mtc8 are formed within one cycle of the intermediate transfer belt 20, and the start mark Msc and the eight sets of mark sets Mtc1 to Mtc8 include a total of 65 marks.

The first mark set Mtc1 includes as a perpendicular mark group consisting of a group of marks which are parallel with the horizontal scanning direction x (width direction of the intermediate transfer belt 20):

first perpendicular mark Akc of Bk;
second perpendicular mark Ayc of Y;
third perpendicular mark Acc of C; and
fourth perpendicular mark Amc of M, and as a diagonal mark group consisting of a group of marks which form an angle of 45 degrees with respect to the horizontal scanning direction x:

first diagonal mark Bkc of Bk;
second diagonal mark Byc of Y;
third diagonal mark Bcc of C; and
fourth diagonal mark Bmc of M.

The marks Akc to Amc, and Bkc to Bmc are arranged at a mark pitch d in the vertical scanning direction y (traveling direction of the intermediate transfer belt 20). The second to eighth mark sets Mtc2 to Mtc8 are identical to the first mark set Mtc1, and the mark sets Mtc1 to Mtc8 are arranged at a clearance c in the vertical scanning direction y.

The last character "r" in the reference names denoting the marks Msr, Akr to Amr, and Bkr to Bmr contained in these test patterns represents that the mark belongs to the rear part, the last character "f" in the reference names denoting the marks Msf, Akf to Amf, and Bkf to Bmf represents that the mark belongs to the front part, and the last character "c" in the reference names denoting the marks Msc, Akc to Amc, and Bkc to Bmc represents that the mark belongs to the center part. These first mark sets to eighth mark sets belonging to the front part, rear part and center part are collectively called "one mark set group".

Figure 6A:
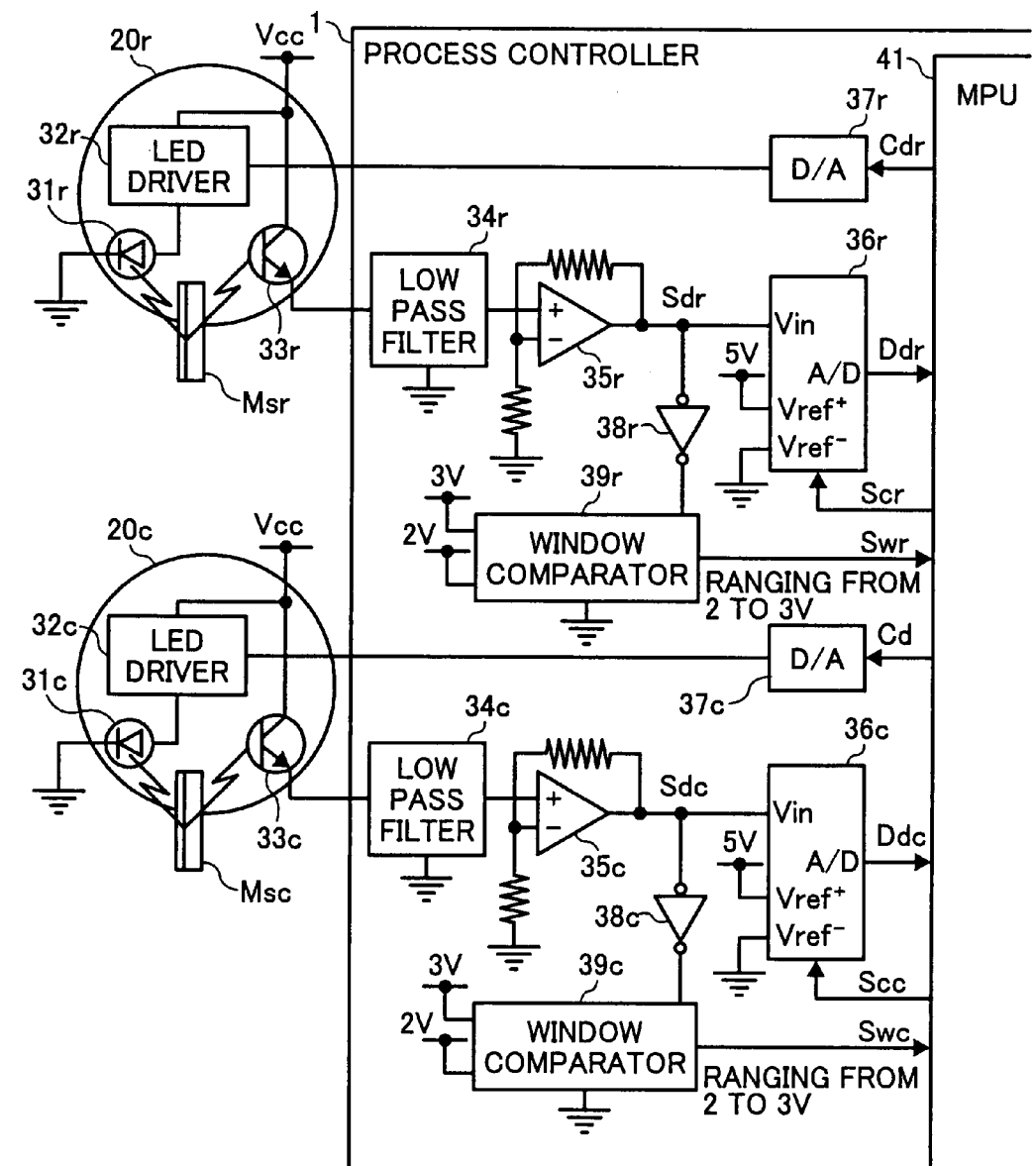
FIG. 6 is a diagram for explaining a part of a control unit of the printer.
Figure 6B:
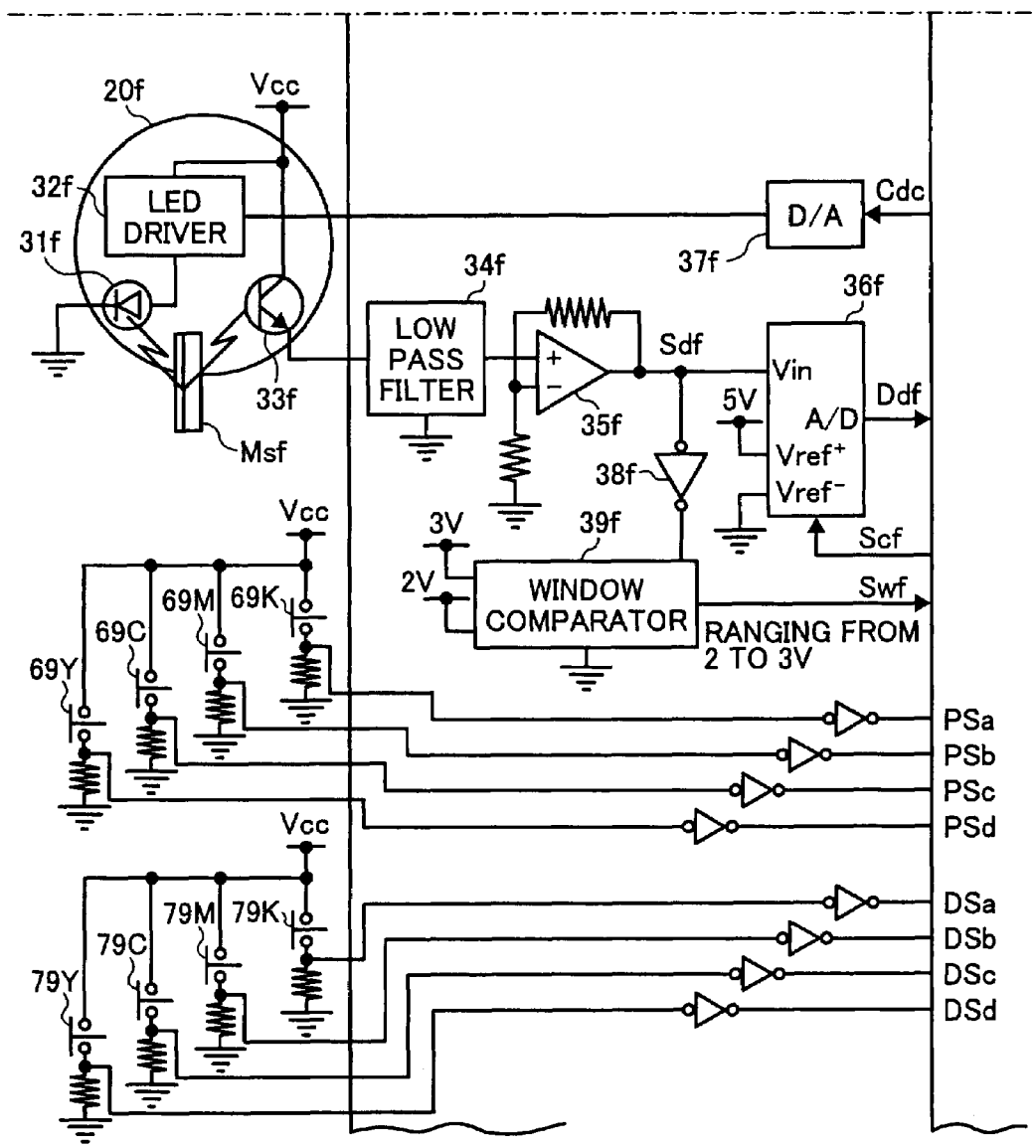

FIG. 6 is a diagram for explaining a part of a control unit of the printer. FIG. 6 depicts micro switches 69K to 69Y for detecting attachment of process cartridges of respective colors, micro switches 79K to 79Y for detecting attachment of developing devices of respective colors, and optical sensors 20r, 20c, and 20f, as well as electric circuits for reading detection signals thereof. In a mark detecting stage, (CPU of) a micro computer (hereinafter, "MPU") 41 composed mainly of ROM, RAM, CPU, and FIFO memory for storing detection data and the like supplies D/A converters 37r, 37c, and 37f with conduction data that specifies conduction currents of light-emitting diodes (LEDs) 31r, 31c, and 31f of the optical sensors 20r, 20c, and 20f. The D/A converters 37r, 37c, and 37f send them to LED drivers 32r, 32c, and 32f after converting them into analogue voltages. These drivers 32r, 32c, and 32f energize the LEDs 31r, 31c, and 31f with currents which are proportional to the analogue voltages from the D/A converters 37r, 37c, and 37f.

The light beams occurring at LEDs 31r, 31c, and 31f hit on the intermediate transfer belt 20 after passing through a slit (not shown), and most part of the light transmits the intermediate transfer belt 20 and is reflected by the tension roller 22. Then the reflected light transmits the intermediate transfer belt 20 and hits on transistors 33r, 33c, and 33f through a slit (not shown). As a result, impedances between collector and emitter in the transistors 33r, 33c, and 33f become low, and emitter potentials of the transistors 33r, 33c, and 33f increase.

When the marks on the intermediate transfer belt 20 reach the positions opposing to the LEDs 31r, 31c, and 31f, the marks block the light from the LEDs 31r, 31c, and 31f. Accordingly, impedances between collector and emitter in the transistors 33r, 33c, and 33f increase, and emitter voltages of the transistors 33r, 33c, and 33f, or levels of detection signals of the optical sensors 20r, 20c, and 20f decrease.

Therefore, as described above, when test patterns are formed on the moving intermediate transfer belt 20, the detection signals of the optical sensors 20r, 20c, and 20f rise or fall. The high level of detection signal means "mark is absent", and the low level of detection signal means "mark is present". In this way, the optical sensors 20r, 20c, and 20f constitute a mark detecting unit that detects each mark of rear side, each mark of center part, and each mark of front side on the intermediate transfer belt 20.

The detection signals of the optical sensors 20r, 20c, and 20f are passed through low-pass filters 34r, 34c, and 34f for removing high-frequency noise and the levels thereof are calibrated to 0 to 5V by amplifies 35r, 35c, and 35f for level calibration, and then applied to A/D converters 36r, 36c, and 36f.

Figure 7A:
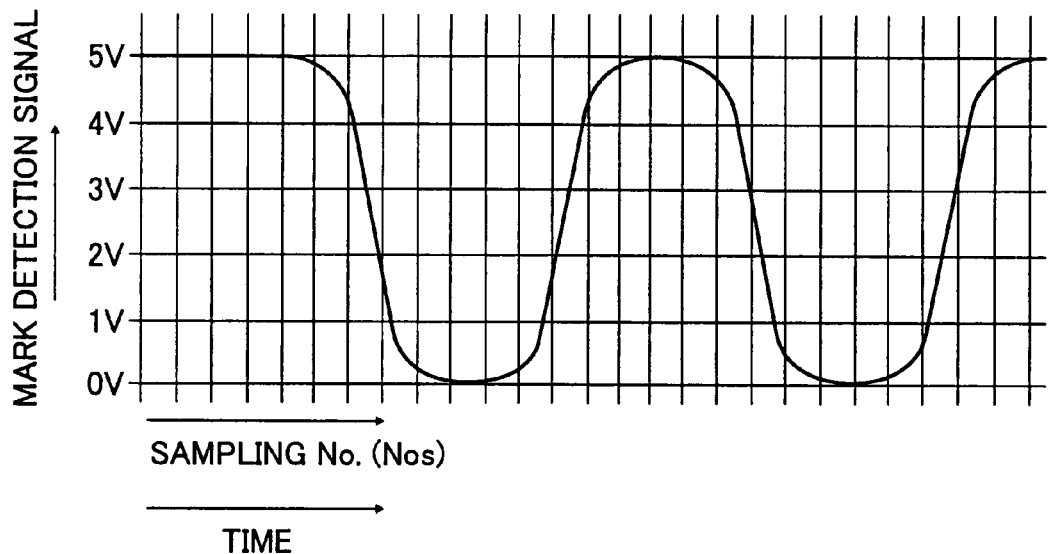
FIG. 7A is a timing chart of detection signals of the mark-patterns.
Figure 7B:
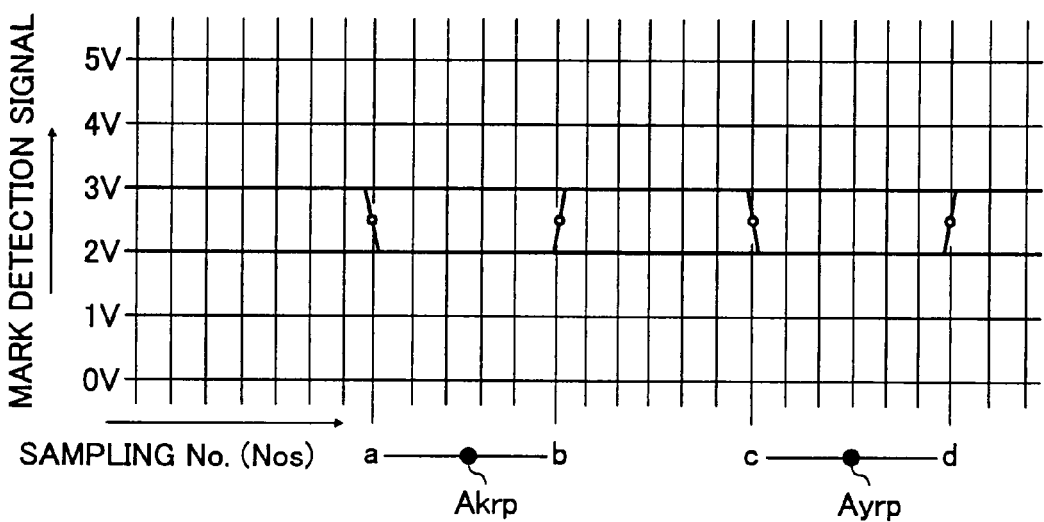
FIG. 7B is a timing chart representing only a range of the detection signals shown in FIG. 7A whose A/D conversion data is written into a FIFO memory.

FIG. 7A is a timing chart of detection signals of the mark-patterns. FIG. 7B is a timing chart representing only a range of the detection signals shown in FIG. 7A whose A/D conversion data is written into a FIFO memory.

The detection signals Sdr, Sdc, and Sdf have the wave forms as shown in FIG. 7A. In other words, at 5 volts(V) the tension roller 22 is detected, and at 0 V a mark is detected. The part where the signal falls from 5 V to 0 V means the leading end of a mark, and the part where the signal rises from 0 V to 5 V means the trailing end of a mark. The width of the mark is defined between the falling part and the raising part. These detection signals Sdr, Sdc, and Sdf are supplied to the A/D converters 36r, 36c, and 36f as shown in FIG. 6, as well as to window comparators 39r, 39c, and 39f through amplifies 38r, 38c, and 38f.

The A/D converters 36r, 36f, and 36c have sample hold circuits on their input sides in the interior thereof, and data latches (output latches) on their output sides. Upon reception of A/D conversion indicating signals Scr, Scc, and Scf from the MPU 41, they hold the current detection signals Sdr, Sdc, and Sdf from the amplifies 35r, 35c, and 35f and convert them to digital data and store in the data latches. Therefore, when it is necessary to read the detection signals Sdr, Sdc, and Sdf, the MPU 41 can supply the A/D converters 36r, 36c, and 36f with the A/D conversion indicating signals Scr, Scc, and Scf, and read digital data representing the levels of the detection signals Sdr, Sdc, and Sdf or detection data Ddr, Ddc, and Ddf.

The window comparators 39r, 39c, and 39f issue level determination signals of low level L Swr, Swc, and Swf when the detection signals from the amplifies 38r, 38c, and 38f are at levels ranging from 2 V to 3 V, and issue level determination signals of high level H Swr, Swc, and Swf when the detection signals from the amplifiers 38r, 38c, and 38f are out of the levels ranging from 2 V to 3 V. FIG. 7B depicts level determination signals of low level L Swr, Swc, and Swf. The MPU 41 can immediately recognize whether the detection signals Sdr, Sdc, and Sdf fall within the range by looking up these level determination signals Swr, Swc, and Swf. Further, the MPU 41 captures from the micro switches 69K to 69Y and 79K to 79Y signals that represent open/close status thereof.

Figure 8A:
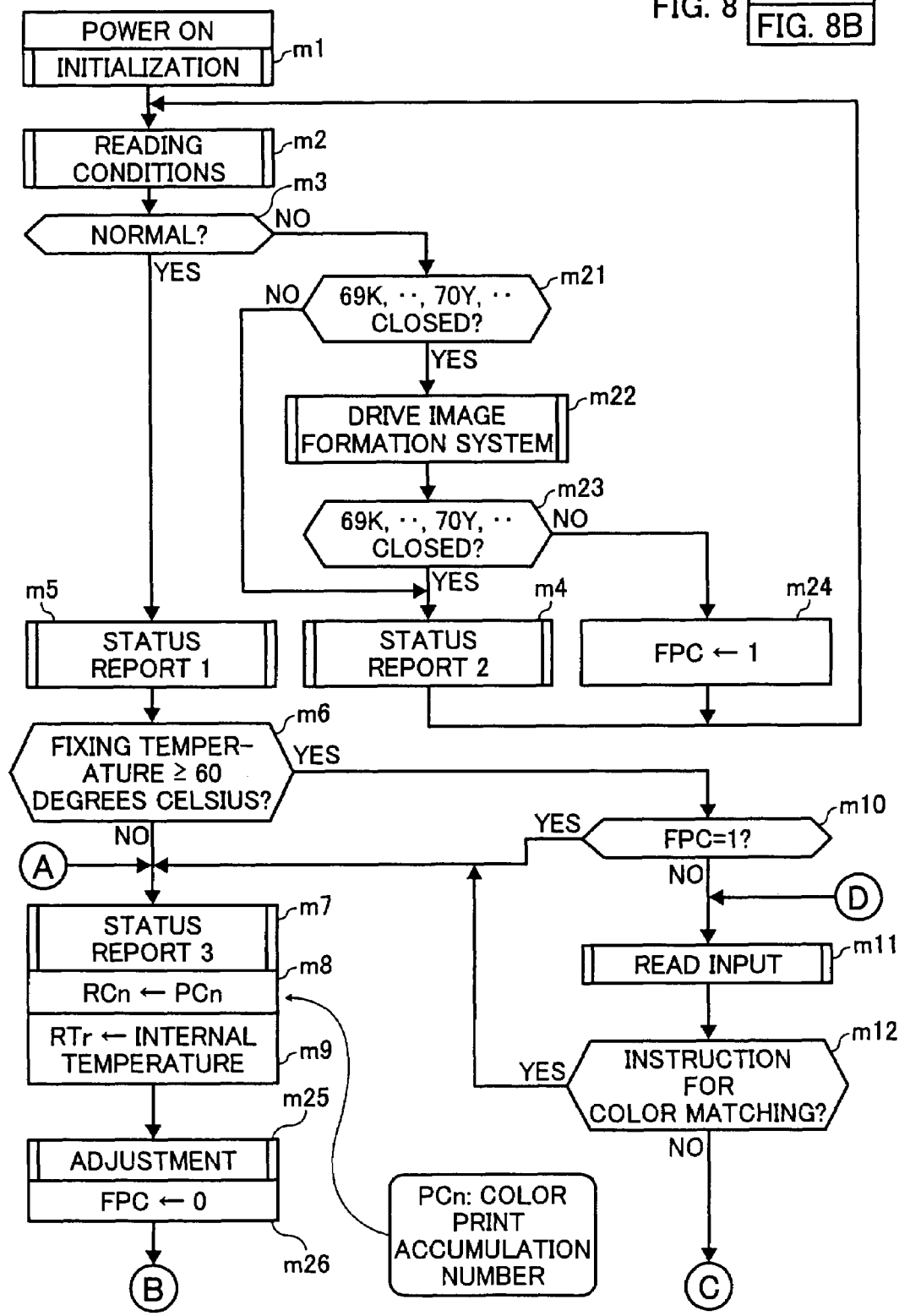
FIG. 8 is a view for explaining a part of control flow of printer.
Figure 8B:
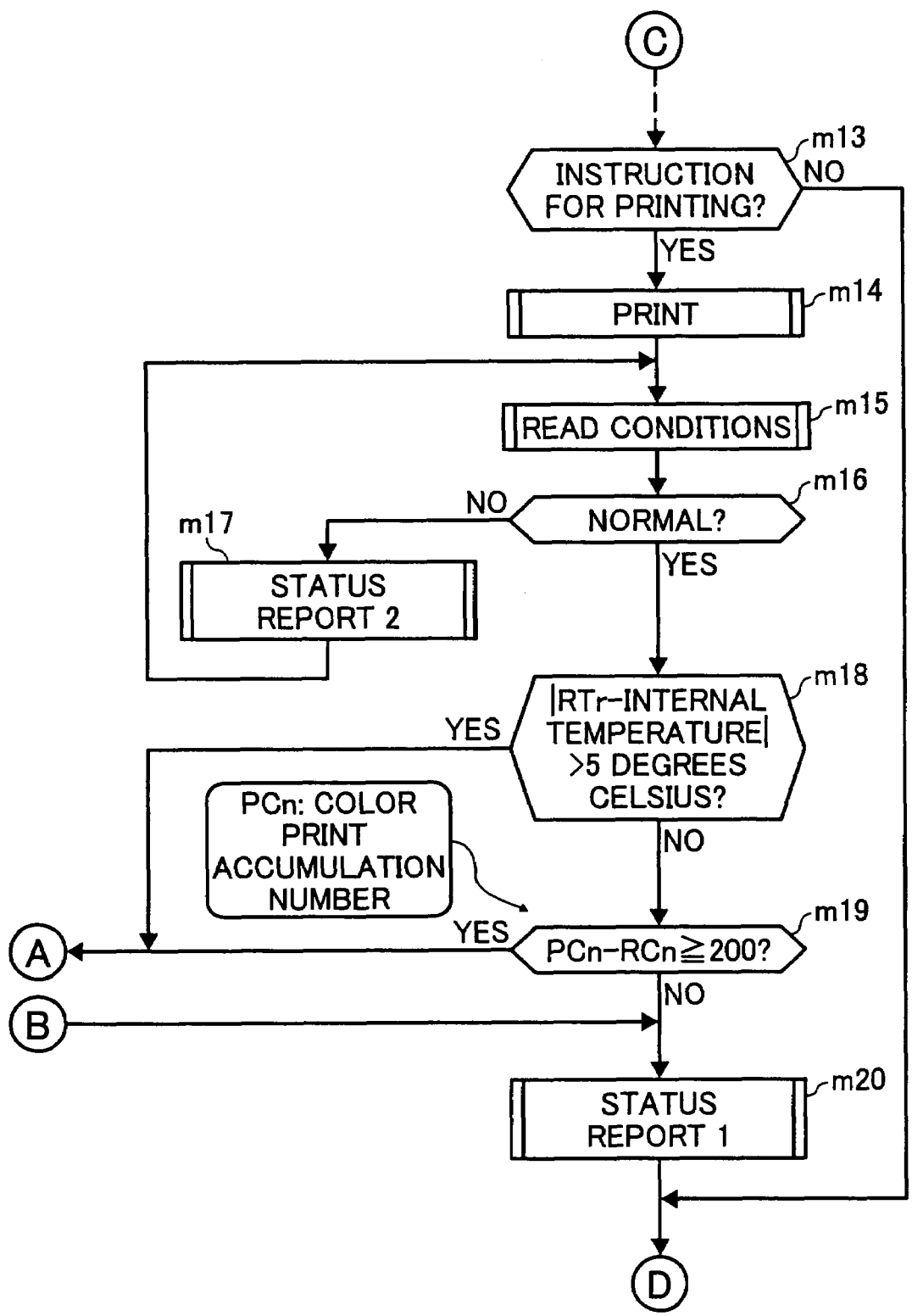

FIG. 8 is a view for explaining a part of control flow of printer. FIG. 8 depicts control flow of the MPU 41.

When operation voltage is applied upon turning on the power, the MPU 41 sets the signal level in the input/output port at a condition for standby state, and sets an internal register and timer at conditions for standby state (m1).

After completing the initialization (m1), the MPU 41 checks whether any trouble occurs in image formation by reading conditions of the mechanical parts and electric circuits of the laser printer (m2 and m3), and when abnormality is found (No in m3); it checks open/close status of the micro switches 69K to 69Y and 79K to 79Y (m21). When any one of the micro switches 69K to 69Y and 79K to 79Y is closed (ON) (Yes in m21), an unit (process cartridge or developing device) corresponding to the closed micro switch is not attached, or it is power ON state immediately after replacement of the unit by a new one. Here, the micro switches 69K to 69Y are switches that detect presence/absence of attachment of four process cartridges including the charging device 11, the photoconductor 10 and the cleaning device 13 of each of the image forming stations 3Y, 3M, 3C, and 3K to the laser printer main body. The micro switches 79K to 79Y are switches that detect presence/absence of attachment of developing device 12 of each of the image forming stations 3Y, 3M, 3C, and 3K to the printer main body.

When any one of the micro switches 69K to 69Y and 79K to 79Y is closed (ON) (YES in m21), the MPU 41 temporarily drives the four image forming systems that respectively form images on the photoconductors 10K to 10M (m22). To be more specific, the intermediate transfer belt 20 is driven, and developing rollers of the charging devices 11K to 11M and the developing devices 12Y to 12K that respectively contact the photoconductors 10K to 10M are rotated. When it is immediately after replacement of the process cartridge or developing device by new one, the micro switch that is in closed state is switched into open state (unit attached) by the drive of the image forming system. On the other hand, when the unit is not attached to the apparatus, the micro switch remains in closed state.

As a result of driving the image forming system, when any one of the micro switches 69K to 69Y and 79K to 79Y that are closed is switched to open state (No in m23), for example, when the micro switches 69K that detects detachment of process cartridge of K (black) is switched from close (PSd=L) to open (PSd=H), the MPU 41 clears the print accumulation number register (one area on nonvolatile memory) corresponding to the image forming stations 3K of K (black) (initialize K color print accumulation number to zero), and writes "1" which indicates that unit is replaced into the register FPC (m24).

On the other hand, when no micro switch is switched to open (YES in m23), it is regarded that there is no unit attachment, and the MPU 41 makes an operation display board (operation panel) notify the abnormality informing that as "status report 2" (m4). Then the flow of condition reading, abnormality check and abnormality report (m2 to m4) is repeated until no abnormality is detected.

Determining that the condition is normal (no abnormality is detected) (YES in m3), the MPU 41 starts energizing the fixing unit 6, and checks whether the fixing temperature of the fixing unit 6 is fixable temperature. When it is not the fixable temperature, the MPU 41 makes the operation board indicate "standby" as a status report 1, and when it is the fixable temperature, the MPU 41 makes the operation display board indicate "print available" (m5).

The MPU 41 also checks whether the fixing temperature is equal to or more than 60 degrees Celsius (m5), and when the fixing temperature of the fixing unit 6 is less than 60 degrees Celsius (NO in m6), it determines that it is in power ON state of leaser printer after long-time suspension (nonuse) (for example, the first turning ON in the morning: environment inside the apparatus largely varies), and makes the operation display board indicate "execution of color matching" as a status report 3 (m7). Next, the color print number accumulation number PCn which is retained in the nonvolatile memory at that time is written into the register RCn (one area of memory) of the MPU 41 (m8), and the internal temperature of the apparatus at that time is written into the register RTr of the MPU 41 (m9), and then "adjustment" (m25) is executed. After completion of the "adjustment", the register FPC is cleared (m26). The contents of the "adjustment" (m25) will be described later.

When the fixing temperature of the fixing unit 6 is equal to or more than 60 degrees Celsius, it can be regarded that the lapse time from previous turning off the laser printer is short. In this case, it can be expected that the internal environment of the apparatus has little changed from the previous turning off to the present. However, when a process cartridge or developing device 12 of any one of colors has been replaced, the environment inside the apparatus has largely changed. Therefore, also when the process cartridge or developing device 12 has been replaced, the "adjustment" is executed. When the fixing temperature of the fixing unit 6 is equal to or more than 60 degrees Celsius (YES in m6), the MPU 41 checks whether information representing unit replacement is generated in Step m24 (FPC is 1) (m10). When information indicative of unit replacement is generated (FPC is 1) (YES in m10), Steps m7 to m9 are executed, and later-described "adjustment" (m25) and Step (m26) are executed.

When the process cartridge or the developing device 12 has not been replaced (No in m10), the MPU 41 waits for input by an operator via the operation display board and a command from the personal computer PC connected with the laser printer, and reads them (m11). Upon reception of instruction for "color matching" from the operator via the operation display board or the personal computer PC (YES in m12), the MPU 41 executes Steps m7 to m9 and executes later-described "adjustment" (m25) and (m26).

Under the condition that the fixing temperature of the fixing unit 6 is fixable temperature, and each part of the apparatus is ready, when a copy start instruction (print instruction) is given from the operation display board or a print start indication from the personal computer PC (YES in m13), the MPU 41 executes image formation of specified number (m14).

Every time image formation of one transfer sheet is completed and transfer sheet is discharged, the MPU 41 increments the data of the print total number register, color print accumulation number register PCn, and print accumulation number registers of K, Y, C, and M that are allocated in the nonvolatile memory, respectively by one, when the image formation is color image formation. When the image formation is monochrome image formation, the data of the print total number register, monochrome print accumulation register, and K print accumulation number register are respectively incremented by one.

The data of the print accumulation number registers of K, Y, C, and M are initialized (cleared) to data which is indicative of zero when a respective color of process cartridge or developing device is replaced new one.

The MPU 41 checks for presence/absence of abnormality such as paper trouble every time one image is formed, while checking presence/absence of abnormality by reading (m15) developing density, fixing temperature, internal temperature of apparatus, and conditions of other parts after completion of image formation of predetermined number (m16). When abnormality is found (NO in m16), it is displayed on the operation display board as a status report 2 (m17), and Steps m15 to m17 are repeated until no abnormality is found.

When image formation is allowed to start, or when it is in the normal condition (YES in m16), whether the difference between the current internal temperature and the internal temperature at the time of previous color matching (data Rtr of register RTr) is more than 5 degrees Celsius is checked (m18). When the temperature change from the internal temperature at the time of previous color matching (data RTr of register RTr) is more than 5 degrees Celsius (YES in m18), the MPU 41 executes Steps m7 to m9 and executes later-described "adjustment" (m25) and (m26).

On the other hand, when the temperature change from the internal temperature at the time of previous color matching (data RTr of register RTr) is not more than 5 degrees Celsius (NO in m18), whether the value of the color print accumulation number register PCn is larger than the value RCn of the color print accumulation number register PCn at the time of previous color matching (data of register RCn) by equal to or more than 200 is checked (m19). When the value of the color print accumulation number register PCn is larger than the value RCn of the color print accumulation number register PCn at the time of previous color matching (data of register RCn) by equal to or more than 200 (YES in m19), Steps m7 to m9 are executed and later-described "adjustment" (m25) and (m26) are executed. When the value of the color print accumulation number register PCn is not larger than the value RCn of the color print accumulation number register PCn at the time of previous color matching (data of register RCn) by equal to or more than 200 (NO in m19), whether the fixing temperature of the fixing unit 6 is fixable temperature is checked. When the fixing temperature of the fixing unit 6 is not the fixable temperature, the operation display board is made to display "standby" as the status report 1, and when the fixing temperature of the fixing unit 6 is the fixable temperature, the operation display board is made to display "printable" (m20), and the flow proceeds to "input reading" (m11).

According to the control flow shown in FIG. 8, the MPU 41 executes the "adjustment" (m25) when (1) the power is turned ON at a fixing temperature of the fixing unit 6 of less than 60 degrees Celsius, (2) either of the K, Y, C, and M units (process cartridges or developing devices) is replaced by new one, (3) instruction for color matching is made by the operation display board or personal computer, (4) a specified number of images have been printed out and the internal temperature has changed by more than 5 degrees Celsius from that at the time of previous color matching, and (5) a specified number of images have been printed out, and the color print accumulation number PCn is larger than the value RCn at the time of previous color matching by equal to or more than 200. Execution of (1), (2), (4), and (5) is referred to as automatic execution, and execution of (3) is referred to as manual execution.

Figure 9A:
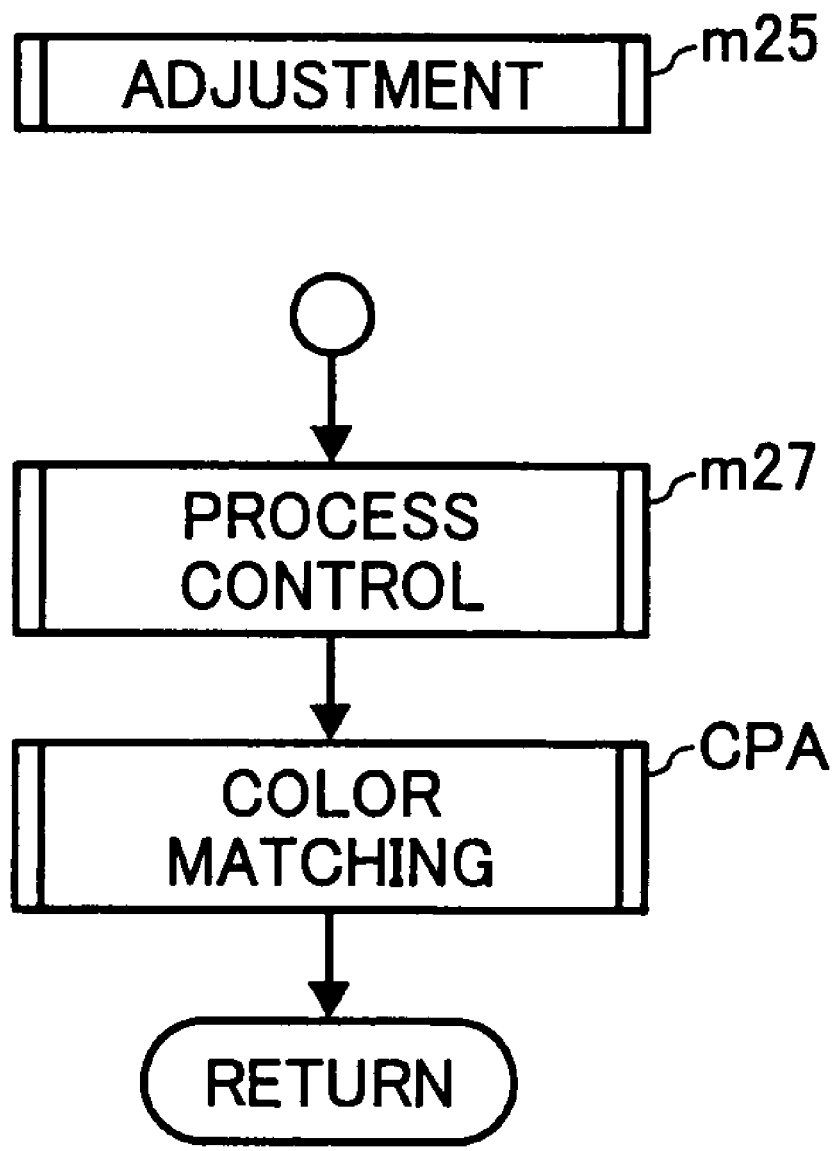
FIG. 9A is a flowchart for explaining an "adjustment"
Figure 9B:
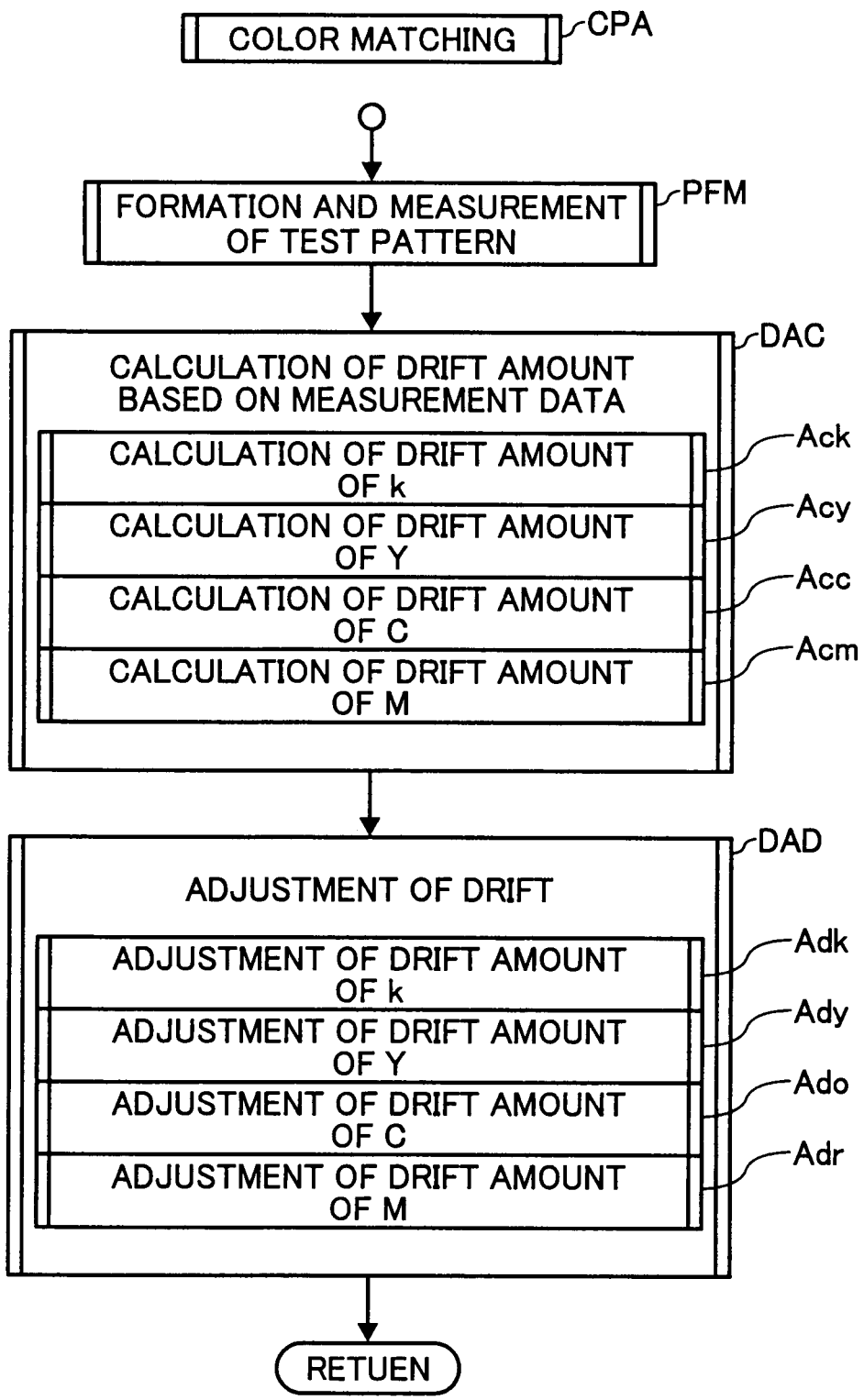
FIG. 9B is a flowchart for explaining a "color matching"

FIG. 9A is a flowchart for explaining an "adjustment". FIG. 9B is a flowchart for explaining a "color matching.

Next, the "adjustment" (m25) will be explained. FIG. 9A is execution flow of "adjustment". First, the MPU 41 sets all the image forming conditions such as charging, exposure, development, and transfer at reference values in "process control" (m27), forms images of K, Y, C, and M in either of the rear part r, center part c, and front part f on the intermediate transfer belt 20, detects image density with either of the optical sensors 20r, 20c, and 20f. The MPU 41 adjusts and sets the voltage applied to the charging device 11 from the power source, exposure intensity of the optical writing unit 4, and development bias of the developing device 12 so that the detected image density is a reference value. Then the MPU 41 executes "color matching" (CPA).

FIG. 9B depicts execution flow of "color matching" (CPA). First, in "formation of measurement of test pattern" (PMF), a test pattern signal generator (not shown) is made to supply the optical writing unit 4 with a test pattern signal in the image formation conditions (parameters) set in the "process control" (m27), and the start marks Msr, Msc, Msf and eight sets of mark set group as shown in FIG. 5 are formed as test patterns in each of the rear part r, center part c, and front part f of the intermediate transfer belt 20. These marks are detected by the optical sensors 20r, 20c, and 20 and the resultant mark detection signals Sdr, Sdc, and Sdf are read in after being converted to digital data, i.e., mark detection data Ddr, Ddc, and Ddf by the A/D converters 36r, 36c, and 36f.

From these mark detection data Ddr, Ddc, and Ddf, the MPU 41 calculates position (distribution) of the middle point of each mark of test pattern on the intermediate transfer belt 20. The MPU 41 also calculates an average pattern (average value group of mark position) of the rear mark set group (eight sets of mark sets), an average pattern (average value group of mark position) of the center mark set group (eight sets of mark sets), and an average pattern (average value group of mark position) of the front mark set group (eight sets of mark sets). The details of the "formation and measurement of test pattern" (PFM) will be described later.

After calculation of the average patterns, the MPU 41 calculates drift amounts in image formation station by each of the average patterns Bk, Y, C, and M based on the average patterns (DAC), and makes adjustment so that the drifts in image formation are removed based on the drift amounts thus calculated (DAD).

Figure 10:
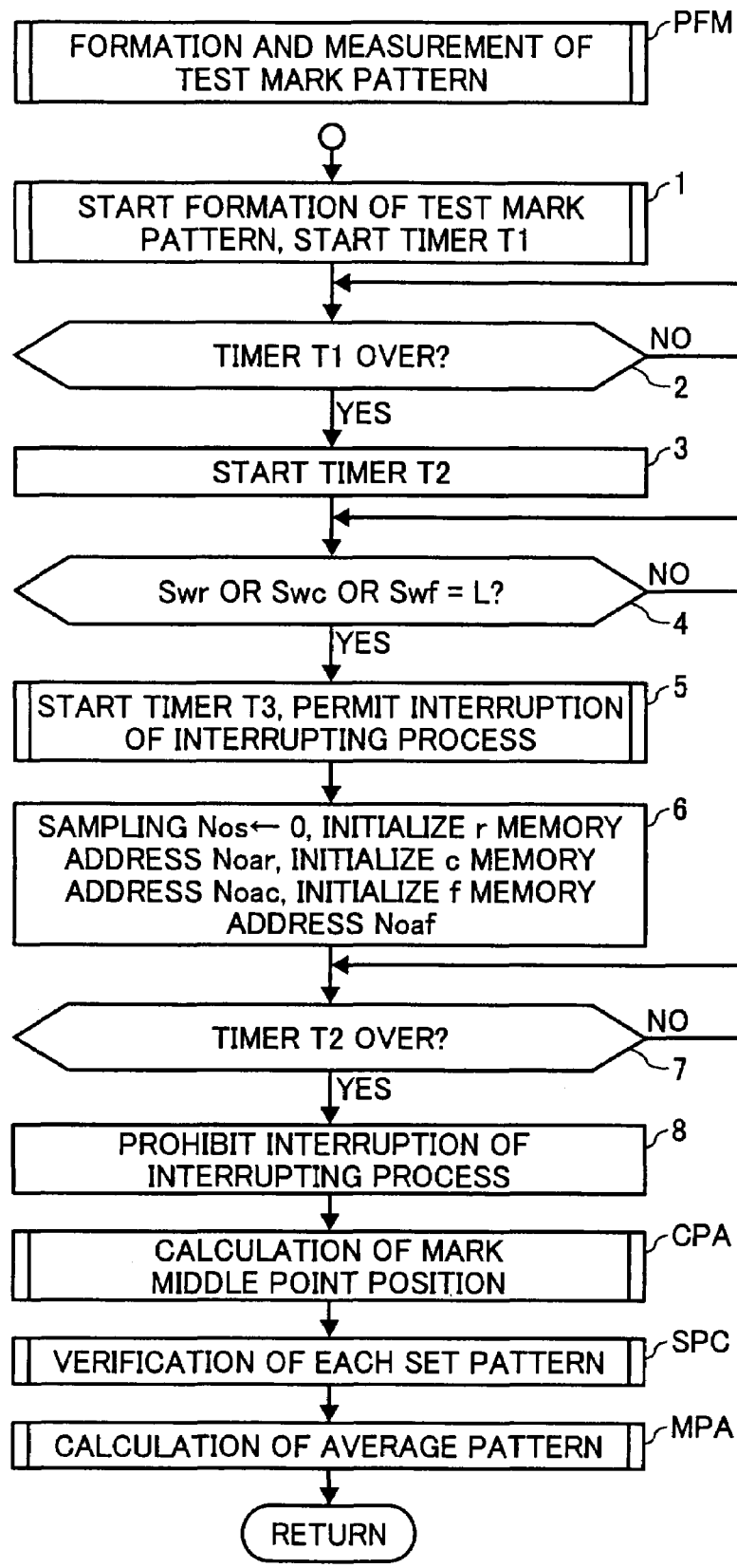
FIG. 10 is a flowchart for explaining a formation and a measurement of the mark-pattern.

FIG. 10 is a flowchart for explaining a formation and a measurement of the mark-pattern. First, the MPU 41 simultaneously forms on the surface of the rear part r, center part c, and front part f of the intermediate transfer belt 20 rotating at a constant velocity of 125 [mm/sec], the start marks Msr, Msc, Msf and eight sets of mark sets having a width w of the vertical scanning direction of the mark of e.g., 1 [millimeter], a length A of the horizontal scanning direction x of e.g., 20 [millimeters], a pitch d of e.g., 3.5 [millimeters], and a clearance c between mark sets of e.g., 9 [millimeters]. To count the timing right before the start marks Msr, Msc, and Msf reach under the optical sensors 20r, 20c, and 20f, start a timer T1 having time limit value of Tw1 (1), and wait for the time-over (time-up) of the timer T1 (2). Upon time-over of the timer T1, the MPU 41 starts a timer T2 having time limit value of Tw2 to measure the timing at which the last marks in the mark set groups in the rear part r, center part c, and front part f of the intermediate transfer belt 20 finish passing through the optical sensors 20r, 20c, and 20f (3).

Figure 11:
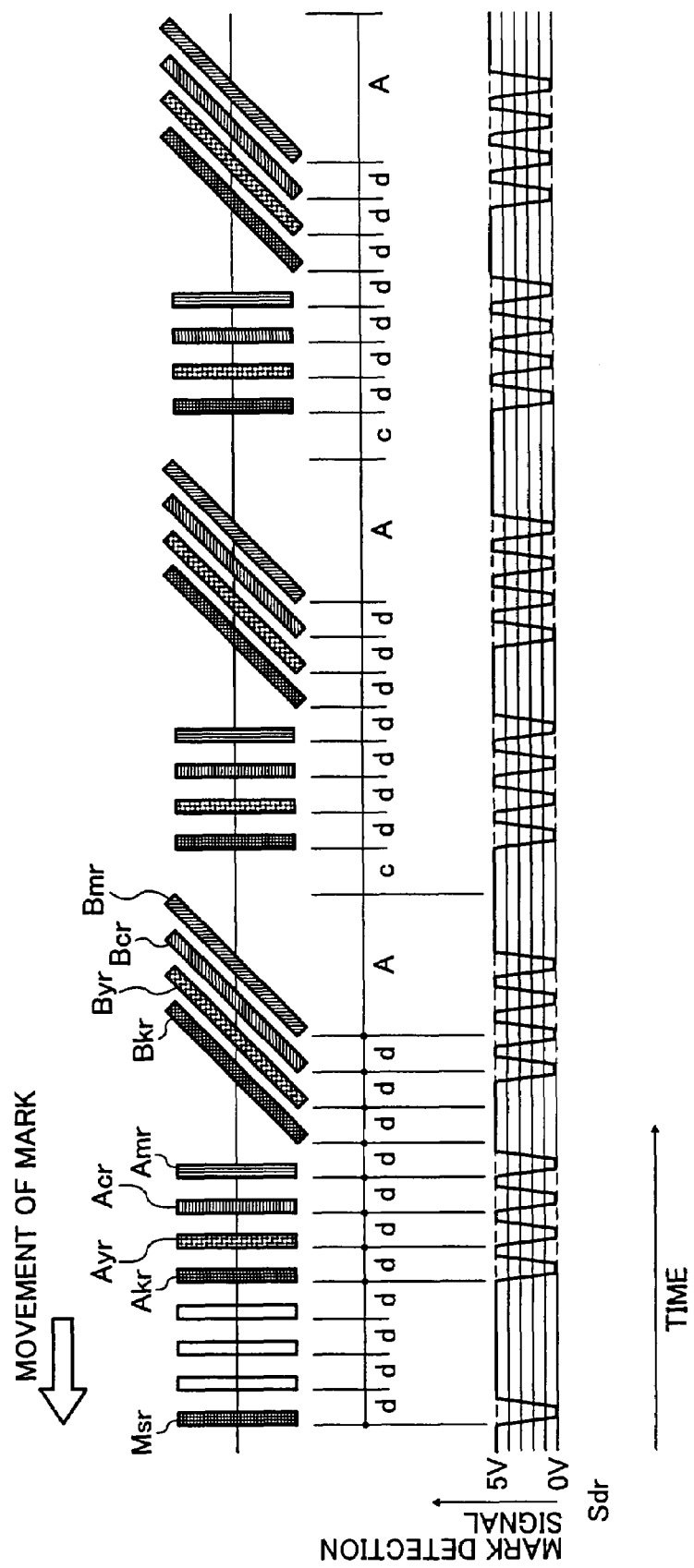
FIG. 11 is a view for explaining a relation between the mark-pattern and level variations of detection signals Sdr, Sdc, and Sdf.

FIG. 11 is a view for explaining a relation between the mark-pattern and level variations of detection signals Sdr, Sdc, and Sdf. As is already described, when there is no mark of K, Y, C or M in the fields of the optical sensors 20r, 20c, and 20f, the detection signals Sdr, Sdc, and Sdf from the optical sensors 20r, 20c, and 20f are 5 V, and when there is a mark in the fields of the optical sensors 20r, 20c, and 20f, the detection signals Sdr, Sdc, and Sdf from the optical sensors 20r, 20c, and 20f are 0 V. Accordingly, constant-velocity movement of the intermediate transfer belt 20 results in the level variations in the detection signals Sdr, Sdc, and Sdf as shown in FIG. 11. FIG. 7A is an enlarged view of a part of such level variation.

As shown in FIG. 10, in the course that the start marks Msr, Msc, and Msf arrive the fields of the optical sensors 20r, 20c, and 20f and the detection signals Sdr, Sdc, and Sdf vary from 5 V to 0 V, the MPU 41 waits for that the level determination signals Swr, Swc, and Swf output from the window comparators 39r, 39c, and 39f of FIG. 6 changes from the H determination signal to the L determination signal which indicates that the detection signals Sdr, Sdc, and Sdf are at 2 to 3 V. As shown in FIG. 7B, since the L determination signal corresponds to the edge area of the mark, the "L" of the level determination signals Swr, Swc, and Swf means that at least one of the edges of the mark has arrived the field of the optical sensors 20r, 20c, and 20f. In other words, in step 4, the MPU 41 monitors whether the leading end of the start marks Msr, Msc, and Msf arrived the optical sensors 20r, 20c, and 20f.

When at least one of the edges of the start marks Msr, Msc, and Msf has arrived the field of the optical sensors 20r, 20c, and 20f, the MPU 41 starts a timer T3 having very short time limit value Tsp (for example, 50 microseconds). The shorter the time limit value Tsp, the more accurately the position of the middle point of mark can be calculated, however, the data stored in the memory increases contradictorily. Contrarily, the longer the time limit value Tsp, the smaller the data amount stored in the memory, however, position of the middle point of the mark cannot be calculated with high accuracy. Therefore, the time-limit value Tsp is determined in consideration of the memory capacity and accuracy of position of middle point of mark.

Figure 12:
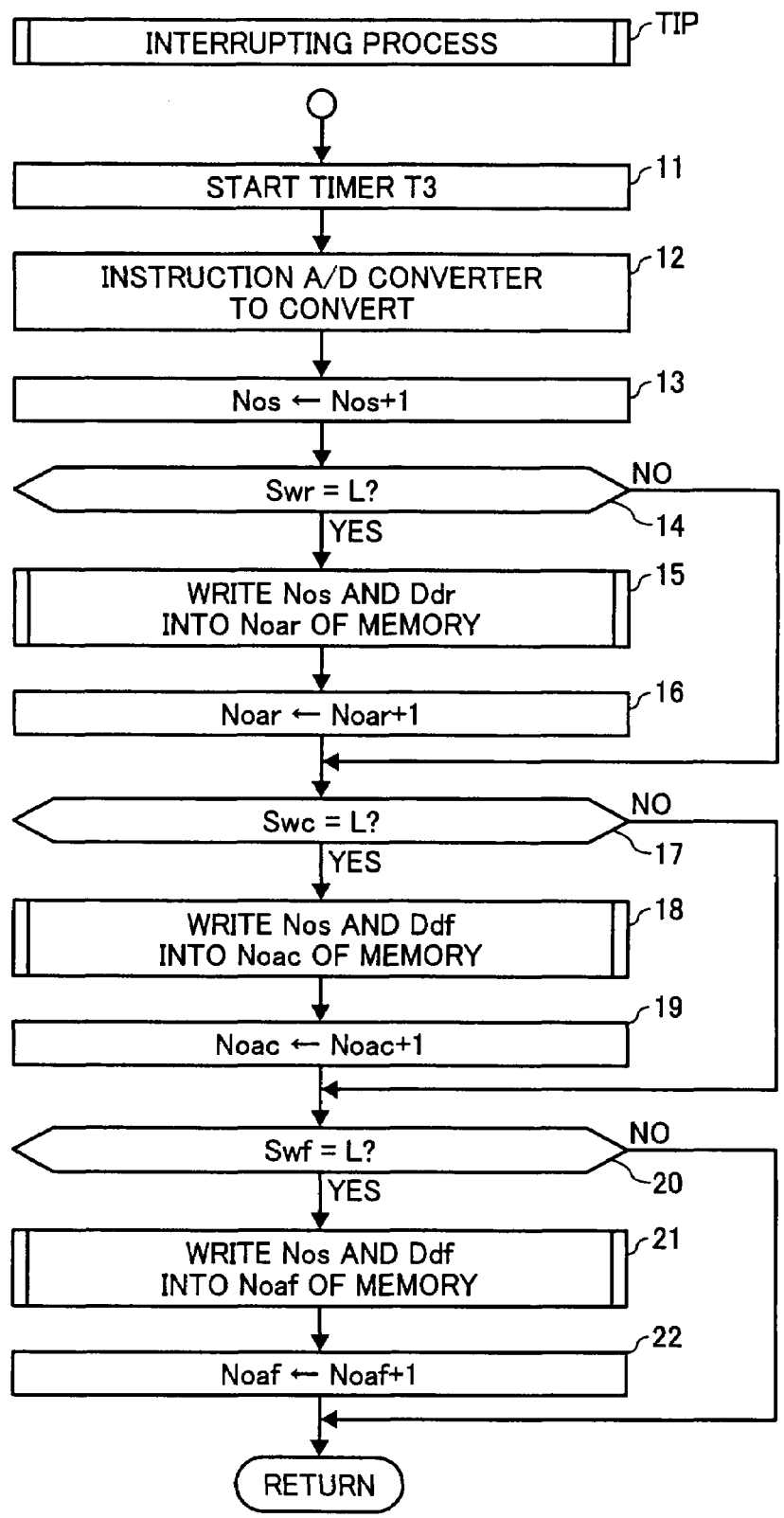
FIG. 12 is a flowchart for explaining an interruption process (TIP)
Figure 13:
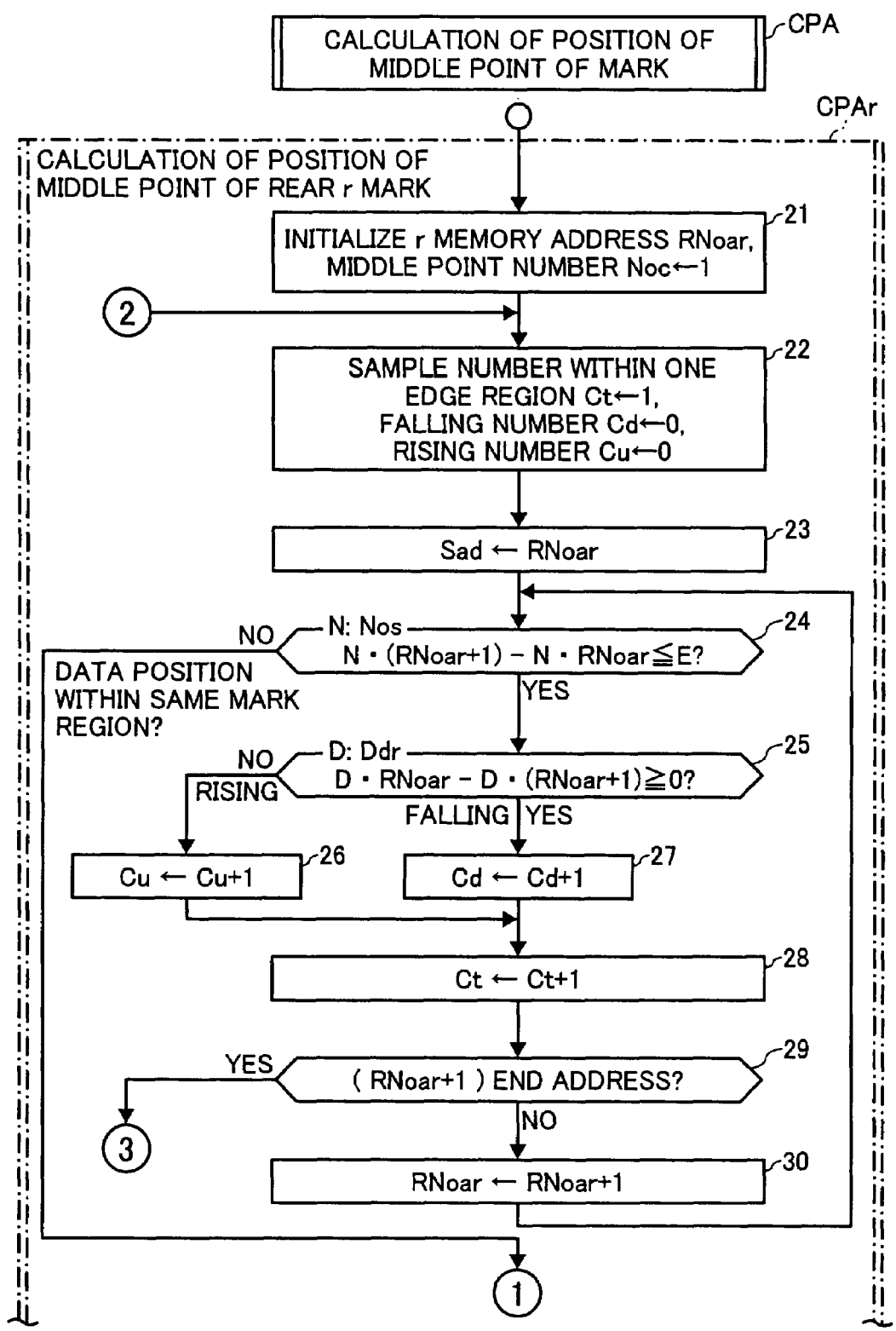
FIG. 13 is a flowchart for explaining one part of a "calculation of mark middle point position (CPA)"

FIG. 12 is a flowchart for explaining an interruption process (TIP). FIG. 13 is a flowchart for explaining one part of a "calculation of mark middle point position (CPA). When the timer T3 is over (Tsp has lapsed), the MPU 41 permits execution of "interruption process" (TIP) shown in FIG. 12. Then the MPU 41 initializes sampling number value Nos of the sampling number register Nos to zero. Also the writing addresses Noar, Noac, and Noaf of r memory (data storage area of rear mark reading data), c memory (data storage area of center mark reading data), and f memory (data storage area of front mark reading data) allocated to the FIFO memory of the MPU 41 are initialized to the start addresses (6). The MPU 41 waits for that the timer Tw2 is over, or waits for that the all of the eight sets of test pattern finish passing through the fields of the optical sensors 20r and 20f (7).

Now, the interruption process will be explained. FIG. 12 is execution flow of "interruption process" (TIP). The process of "interruption process" (TIP) is executed every time the timer 3 having time-limit value of Tsp is over. The MPU 41 first starts the timer T3 (1), and instructs the A/D converters 36r, 36c and 36f to conduct A/D conversion (12). In other words, voltages of the detection signals Sdr, Sdc, and Sdf from the amplifiers 35r, 35c, and 35f at that time are held and converted into digital data, and retained in the data latch. Further, the MPU 41 increments the sampling number value Nos of the sampling number register Nos which is A/D conversion instruction number by one (13).

As a result, the NosxTsp represents the lapse time from the time of detection of a leading edge of either one of the start marks Msr, Msc, and Msf (=current position of the intermediate transfer belt opposing the optical sensors 20r, 20c, and 20f in the vertical scanning direction (belt traveling direction) based on either one of the start marks Msr, Msc, and Msf)).

The MPU 41 checks whether the detection signal Swr from the window comparator 39r is L (the optical sensor 20r is detecting an edge part of the mark, and 2V≦Sdr≦3V) (14). When the detection signal Swr from the window comparator 39r is L (YES in S14), sampling number value Nos of the sampling number register Nos and A/D conversion data Ddr stored in the data latch (digital value of mark detection signal Sdr of the optical sensor 20r) are written as writing data into the address Noar of the r memory (15), and the writing address of r memory Noar is incremented by one (16).

When the detection signal Swr from the window comparator 39r is H (Sdr<2V or 3V<Sdr), the MPU 41 does not write the A/D conversion data Ddr retained in the data latch into the r memory. This helps reduction of data writing amount of memory and simplification of subsequent data processing.

Next, likewise the above, the MPU 41 checks whether the detection signal Swc from the window comparator 39c is L (the optical sensor 20c is detecting an edge part of the mark, and 2V≦Sdc≦3V) (17), and when the detection signal Swc from the window comparator 39c is L, it writes sampling number value Nos of the sampling number register Nos and A/D conversion data Ddc (digital value of mark detection signals Sdc of the optical sensor 20c) as writing data into the address Noac of the c memory (18), and increments the writing address Noac of the c memory by one (19).

Next, the MPU 41 checks whether the detection signal Swf from the window comparator 39f is L (the optical sensor 20f is detecting an edge part of the mark, and 2V≦Sdf≦3V) (20), and when the detection signal Swf from the window comparator 39f is L, it writes sampling number value Nos of the sampling number register Nos and A/D conversion data Ddf (digital value of mark detection signals Sdf of the optical sensor 20f) as writing data into the address Noaf of the f memory (21), and increments the writing address Noaf of the f memory by one (22).

Since such interruption process is repeatedly executed at a cycle of time Tsp, when the mark detection signals Sdr, Sdc, and Sdf of the optical sensors 20r, 20c, and 20f vary up and down as shown in FIG. 7A, only digital data Ddr, Ddc, and Ddf of the detection signals Sdr, Sdc, and Sdf ranging between 2 V and 3 V shown in FIG. 7B is stored together with the sampling number value Nos in the r memory and the f memory which are allocated to the FIFO memory within the MPU 41. From the sampling number value Nos stored in each memory (r, c, and f), the position in the vertical scanning direction y (belt traveling direction) of each mark from the start mark can be described (time Tsp x sampling number value Nos x conveyance velocity of intermediate transfer belt).

After the last mark of mark set group (the last mark of the eighth set of mark sets) has passed the optical sensors 20r, 20c, and 20f, the timer T2 is over. As shown in the flow of FIG. 10, when the timer T2 is over (YES in 7), the interruption process is prohibited (8). Next, the MPU 41 calculates position of a middle point of each mark based on the detection data Ddr, Ddc, and Ddf of the r memory, c memory and f memory in the FIFO (CPA).

Position of the middle point of a mark may be evaluated in the following manner. As data to be written into writing addresses Noar, Noac, and Noaf of each memory, plural sets of data ranging from 2 V to 3 V are respectively stored that correspond to the falling region where the level of the mark detection signal falls and that correspond to the subsequent rising region where the level rises. From the sets of data corresponding to the first falling region of K mark, a middle position a is calculated, and from the sets of data corresponding to the rising region of K mark, a middle position b is calculated. Next, from the middle position a and the middle position b, a middle point of K mark (middle point Akrp) is calculated. Likewise, a middle position c of the falling region of the next mark (Y color) and a middle position d of the subsequent rising region are calculated from the sets of data corresponding to the respective regions, and then a middle point (middle point Akrp) of Y mark is calculated. These processes are executed for each mark.

Figure 14:
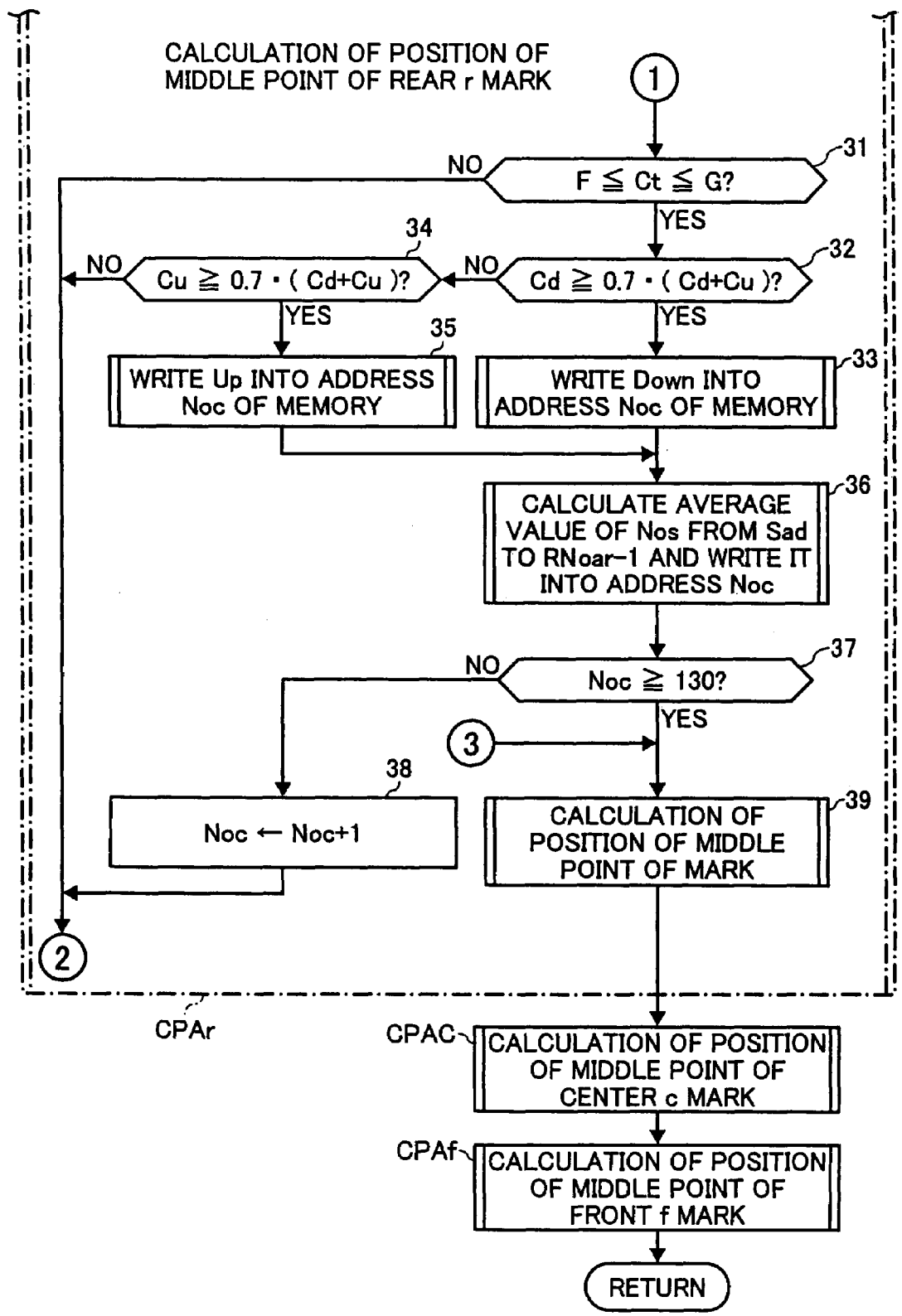
FIG. 14 is a flowchart for explaining another part of the "calculation of mark middle point position (CPA)"

In the following, concrete explanation will be made with reference to FIGS. 13 and 14. FIGS. 13 and 14 are flow charts of "calculation of position of mark middle point" (CPA). Here, "calculation of position of middle point of mark in rear part r" (CPAr)", "calculation of position of middle point of mark in center part c" (CPAc)" and "calculation of position of middle point of mark in front part f" (CPAf)" are executed.

In the "calculation of position of middle point of mark in rear part r" (CPAr)", the MPU 41 first initializes the reading address RNoar of the r memory allocated to the FIFO memory therein, and initializes the data of edge middle point number register Noc at 1 which is indicative of the first edge (21). This edge middle point number register Noc corresponds to a, b, c, and d . . . shown in FIG. 7B. Then the MPU 41 initializes data Ct of sample number register within one edge region Ct at 1, and initializes data Cd and Cu of the falling number register Cd and the rising number register Cu at zero (22). Then the MPU 41 writes reading address RNoar into edge region data group leading address register Sad (23). These are the preparatory process for data processing of first edge region.

Next, the MPU 41 reads from address RNoar of the r memory, data (position Nos in the vertical scanning direction y: N·RNoar, detection level Ddr: D·RNoar). The position Nos in the vertical scanning direction y: N·RNoar is obtained by multiplying time Tsp, by sampling number value Nos and by conveyance velocity of intermediate transfer belt. The MPU 41 also reads out the data from the subsequent address RNoar+1 (y position Nos: N·(RNoar+1), detection level Ddr: D·(RNoar+1)). Then it checks whether the difference of y directional position of the both read data (N·(RNoar+1)−N·RNoar) is equal to or less than E (for example, E=w/2=value corresponding to e.g., ½ millimeters) (on the same edge region) (24). When the difference of position in the y direction of the both read data (N·(RNoar+1)−N·RNoar) is equal to or less than E (YES in 24), whether the difference in detection level between these read data (D·RNoar−D·(RNoar+1) is equal to or more than zero is determined (25).

When the difference in detection level between these data is equal to or more than zero (Yes in 25), it represents the falling trend, so that data Cd of the falling number register Cd is incremented by one (S27). On the other hand, when the difference in detection level between these data is equal to or less than zero (NO in 25), it represents the rising trend, so that data Cu of the rising number register Cu is incremented by one (26).

Next, the MPU 41 increments data Ct of the sample number register within one edge Ct by one (28). Then the MPU 41 checks whether the memory reading address RNoar of the r memory is an end address of the r memory (29), and when the reading address RNoar of the memory reading address is not an end address of the r memory (NO in S29), the memory reading address RNoar is incremented by one (30) and the process (24 to 30) are repeated.

FIG. 14 is a flowchart for explaining another part of the "calculation of mark middle point position (CPA)". On the other hand, when the reading data varies from that of the first edge region to the next edge region, the positional difference between position data of the former and the latter memory addresses (N·(RNoar+1)−N·RNoar) is larger than E in Step 24 (NO in S24), and the flow proceeds from Step 24 to Step 31 of FIG. 14. By proceeding to Step 31, checking of every sampling data of one mark edge (leading edge or trailing edge) region for falling and rising trends have been completed.

Next, the MPU 41 checks whether sample number data Ct of the sample number register within single edge Ct at this time is a corresponding value within a single edge region (ranging from 2 V to 3 V) (31). In other words, whether F<ct<G is checked. Here, the symbol "F" means a lower limit value of data written into the r memory when a leading edge or trailing edge of properly formed mark is detected, and the symbol "G" means an upper limit (set value) value of data written into the r memory when a leading edge or trailing edge of properly formed mark is detected.

When Ct satisfies F≦Ct≦G (YES in 31), it is regarded that reading and data storage are properly conducted, and whether the first edge exhibits falling trend or rising trend is checked (32 and S34). To be more specific, when the data Cd of the falling number register Cd is equal to or more than 70% of the sum of the data Cd of the falling number register Cd and the data Cu of the rising number register Cu (Cd≧0.7(Cd+Cu)) (YES in 32), the MPU 41 writes information Down representing falling into the address to the edge No. of memory Noc (33). Further, when the data Cu of the rising number register Cu is equal to or more than 70% of Cd+Cu of the rising number register Cu (Cu≧0.7(Cd+Cu)) (YES in 34), the MPU 41 writes information Up which is indicative of rising trend into the address to the edge No. of memory Noc (35). Next, the MPU 41 calculates an average value of the y position data of the first edge region, i.e., the middle point position of the edge region (a in FIG. 7B), and writes it into the address to the edge No. of memory Noc (36).

Then the MPU 41 checks whether the edge No. Nos is equal to or more than 130, or checks whether calculation of middle position of every mark in the leading edge region and trailing edge region in the start mark Msr and eight sets of mark sets have been completed (37). When the edge No. Nos is equal to or less than 130, the data of the edge middle point number register Noc is incremented into 2 representing the second edge (trailing end of the mark Akr of K) from 1 representing the first edge (leading end of the mark Akr of K). As to the second edge, the process of Steps S22 to S36 is executed, and information which is indicative of rising or falling and middle point position of edge region (b in FIG. 7B) are written into the address to the edge No. of memory Noc. Such a process is repeated up to the edge region of the trailing end of the last mark (Bmr) of the eight sets of mark sets.

On the other hand, upon completion of calculation of middle position of each mark in the leading edge region and trailing edge region for every start mark Msr and eight sets of mark sets (YES in S37) or when the r memory reading address RNoar is a r end address, namely when reading of stored data from the r memory has completed (YES in S29), a mark middle point position is calculated based on the edge middle point position data (y position data calculated in step 36) (39).

For calculating a mark middle point position, first data of the address to edge No. of memory Noc (falling/rising data and position data of edge middle point) is read out. Then, whether the positional difference between the middle point position of the previous falling edge region and the middle point position of the rising edge region immediately after that falls within the range corresponding to the width w in the y direction of the mark is checked. When the positional difference between the middle point position of the previous falling edge region and the middle point position of the rising edge region immediately after that does not fall within the range corresponding to the width w in the y direction of the mark, these data is deleted. When the positional difference between the middle point position of the previous falling edge region and the middle point position of the rising edge region immediately after that falls within the range corresponding to the width w in the y direction of the mark, an average value of these data is determined, and written to the mark No. from the leading end in the memory as a middle point position of one mark. When all of the mark formation, mark detection and detection data processing are properly executed, middle point position data for a total of 65 marks including start mark Msr and eight sets of mark sets (8 marks/set×8=64 marks) is obtained in regard to the rear part r, and stored in the memory.

Next, the MPU 41 executes "calculation of mark middle point position of center c" (CPAc) in the same manner as described in the "calculation of mark middle point position of rear r" (CPAr), and measurement data on the memory is processed. When all of the mark formation, measurement and measurement data processing are properly executed, middle point position data for a total of 65 marks including start mark Msc and eight sets of mark sets (64 marks) is obtained in regard to the center part c, and stored in the memory.

Next, the MPU 41 executes "calculation of mark middle point position of front f" (CPAf) in the same manner as described in the "calculation of mark middle point position of rear r" (CPAr), and measurement data on the memory is processed. When all of the mark formation, mark measurement and measurement data processing are properly executed, middle point position data for a total of 65 marks including start mark Msf and eight sets of mark sets (8 marks/set×8=64 marks) is obtained in regard to the front part f, and stored in the memory.

Upon completion of calculation of middle point position of mark in the manner as described above, the MPU 41 executes "verification of each set pattern" (SPC) as described in FIG. 10. By the "verification of each set pattern" (SPC), whether the data group of middle point position of mark written into the memory has center point distribution corresponding to the mark distribution shown in FIG. 5 is verified. First the MPU 41 deletes from the mark middle point position data group written into the memory, the data that is out of the mark distribution shown in FIG. 5 in set units, and as a result, only the data sets (position data group consisting of 8 pieces of data per one set) that show the distribution pattern corresponding to the mark distribution shown in FIG. 5 are left. When everything is proper, eight sets of data in the rear part r, eight sets of data in the center part c, and eight sets of data in the front part f are left in the group of mark middle point position data written in the memory.

Next, the MPU 41 changes the middle point position data of the first mark (Akr) of each set that follows the second set, into the middle point position of the first mark (Akr) of the leading set (first set) in the rear data set, and changes the middle point position data of the second to the eighth marks by the differential values corresponding to the changes. That is, the MPU 41 makes changes on the middle point position data group of each set that follows the second set in such a manner that the values are shifted in the y direction so that the middle point position of the leading mark of each set matches the middle point position of the leading mark of the first set. The MPU 41 also changes the middle point position data in each set that follows the second set in the center part c and front part f in the same way.

Figure 15:
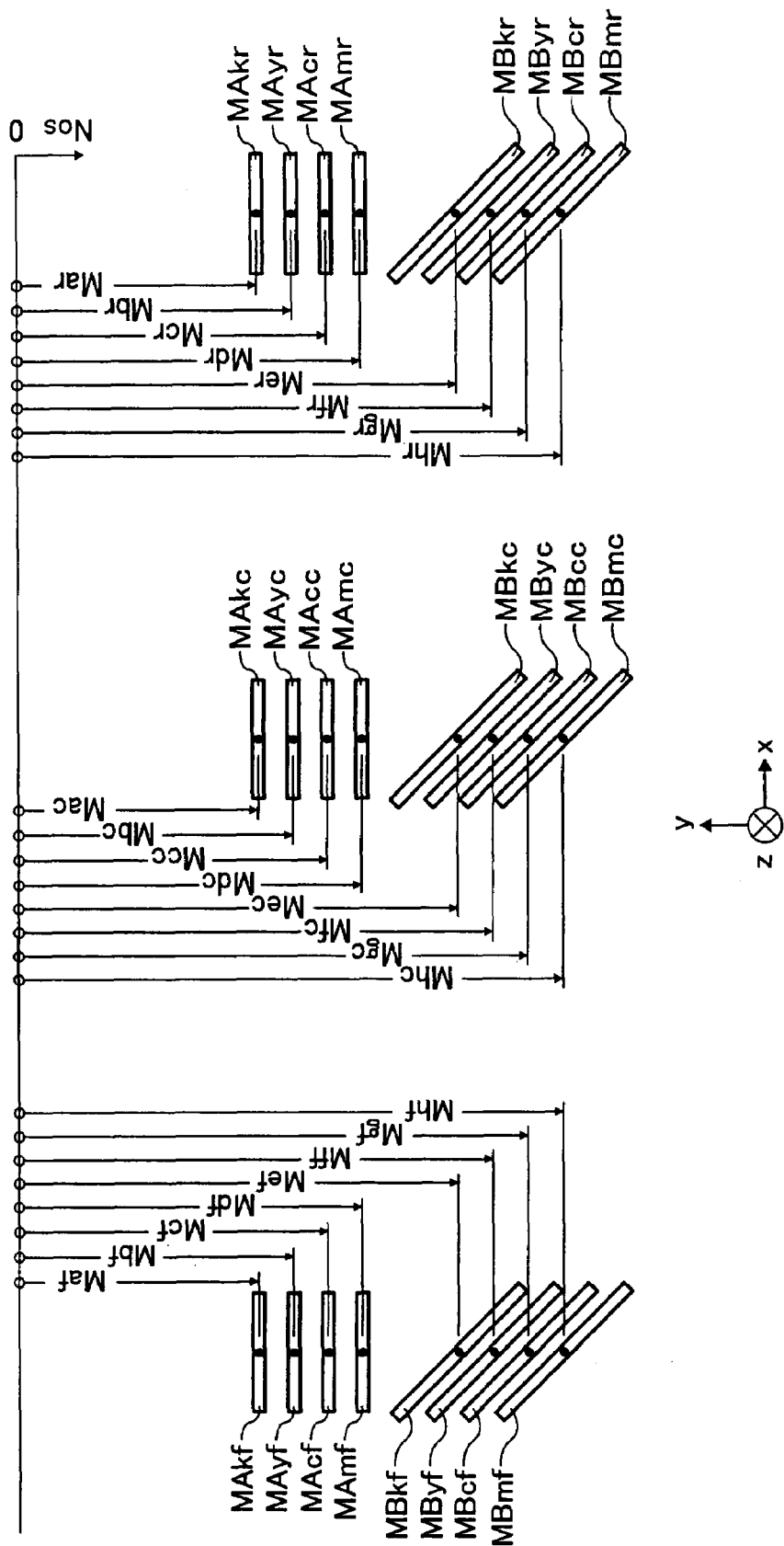
FIG. 15 is a view for explaining an assumed average position mark.

FIG. 15 is a view for explaining an assumed average position mark. Next, the MPU 41 executes "calculation of average pattern" (MPA). First, the MPU 41 calculates average values Mar to Mhr of the middle point position data of each mark for every set in the rear part r. In a similar manner, it calculates average values Mac to Mhc and Maf to Mhf of the middle point position data of each mark for every set in the center part c and the in the front part f. These average values represent middle point positions of hypothetical average position marks that distribute as shown in FIG. 15:

MAkr (representative of rear perpendicular mark of Bk);
MAyr (representative of rear perpendicular mark of Y);
MAcr (representative of rear perpendicular mark of C);
MAmr (representative of rear perpendicular mark of M);
MBkr (representative of rear diagonal mark of Bk);
MByr (representative of rear diagonal mark of Y);
MBcr (representative of rear diagonal mark of C);
MBmr (representative of rear diagonal mark of M);
MAkc (representative of center perpendicular mark of Bk);
MAyc (representative of center perpendicular mark of Y);
MAcc (representative of center perpendicular mark of C);
MAmc (representative of center perpendicular mark of M);
MBkc (representative of center diagonal mark of Bk);
MByc (representative of center diagonal mark of Y);
MBcc (representative of center diagonal mark of C);
MBmc (representative of center diagonal mark of M);
MAkf (representative of front perpendicular mark of Bk);
MAyf (representative of front perpendicular mark of Y);
MAcf (representative of front perpendicular mark of C);
MAmf (representative of front perpendicular mark of M);
MBkf (representative of front diagonal mark of Bk);
MByf (representative of front diagonal mark of Y);
MBcf (representative of front diagonal mark of C); and
MBmr (representative of front diagonal mark of M).

Upon completion of the "formation and measurement of test pattern" (PFM) as described above, the MPU 41 executes "calculation of drift amount based on measurement data" (DAC) as shown in FIG. 9B, and calculates an amount of color drift. In the present printer, color drifts of Y, M, and C relative to K are calculated. In the following, calculation of color drift of Y is concretely explained.

Figure 16:
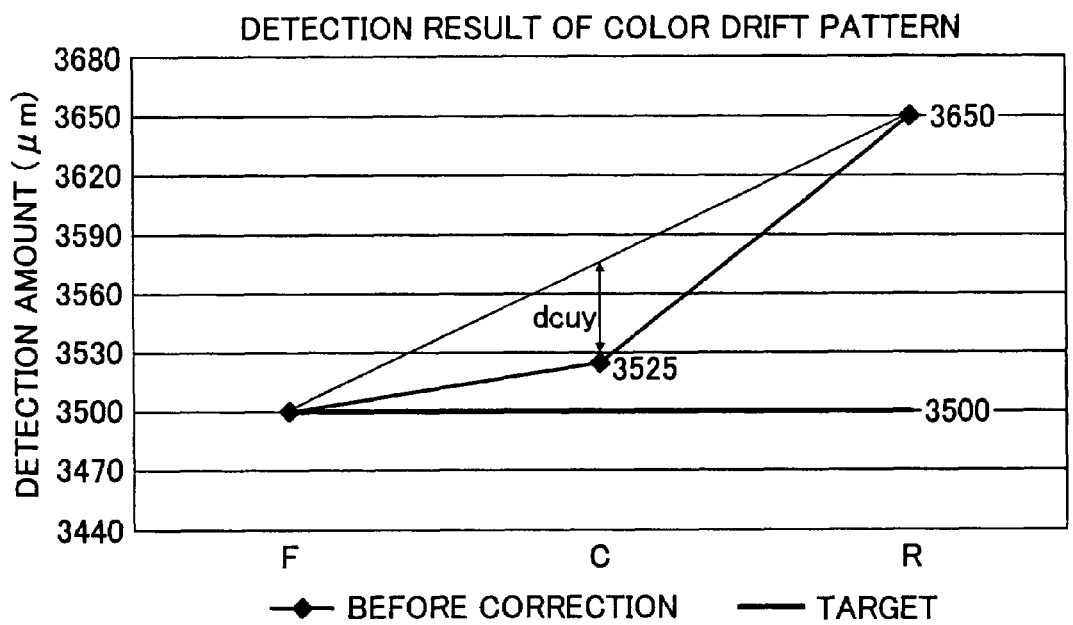
FIG. 16 is a view for explaining a positional drift in an assumed-scanning direction y from an ideal position of Y image.

FIG. 16 is a view for explaining a positional drift in an assumed scanning direction y from an ideal position of Y image. First, the MPU 41 determines distance dyyr between the rear perpendicular mark MAkr of reference color K and the rear perpendicular mark MAyr of Y based on the difference in middle point position between the perpendicular mark MAkr of k and the perpendicular mark MAyr (Mbr to Mar). In the same manner, distance dyyc between the center perpendicular mark MAkc of reference color K and the center perpendicular mark MAyc of Y is determined from the difference between the respective middle point positions (Mbc to Mac). Further, distance dyyf between the front f perpendicular mark MAkf of reference color K and the front f perpendicular mark MAyf of Y is determined from the difference between the respective middle point positions (Mbf to Maf). FIG. 16 depicts distance in the vertical scanning direction y of the Y image, relative to the K image determined in the manner as described above. The bold line in the drawing represents target (ideal) distance d (clearance d (pitch 3.5 millimeters) shown in FIG. 5) of the Y perpendicular mark to the K perpendicular mark.

Then the MPU 41 calculates curve amount dcuy in the vertical scanning direction y of Y image, relative to K image. The curve amount dcuy in the vertical scanning direction y of Y image, relative to K image is determined by Equation 5.

$$dcuy = \frac{dyyr + dyyf}{2} - dyyc \tag{5}$$

Then the MPU 41 calculates correction amount dRyy in the vertical scanning direction y of Y image. The correction amount dRyy in the vertical scanning direction y of Y image is calculated according to the following Equation on the basis of the curve amount dcuy and target distance d of Y perpendicular mark with respect to the K perpendicular mark.

$$dRyy = \frac{dyyr + dyyf}{2} - d - \frac{dcuy}{2} \tag{6}$$
$$= \left[\left(\frac{dyyr + dyyf}{2} + dyyc\right)\bigg/2\right] - d$$

The value calculated by the mathematical Equation 6 is correction amount of vertical scanning direction y, and in the deviation adjustment DAD as will be described later, color drift is corrected based on the correction amount thus calculated.

Then the MPU 41 calculates skew amount dsqy of Y image, relative to K image. The skew amount dsqy of Y image, relative to K image is determined according to Mathematical Equation 7.

$$dsqy = \frac{dyyr + dyyf}{2} \tag{7}$$

The value determined in Mathematical Equation 7 is skew correction amount, and in deviation adjustment DAD as will be described later, skew correction is conducted based on the skew amount dsqy thus calculated.

Figure 17:
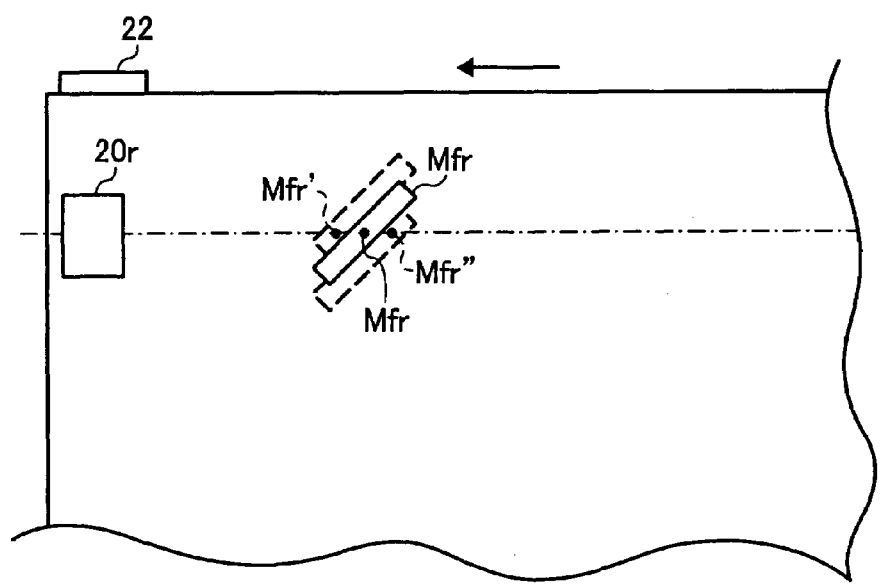
FIG. 17 is a view for explaining a crossing mark MByr is displaced in a horizontal scanning direction.

FIG. 17 is a view for explaining a crossing mark MByr is displaced in a horizontal scanning direction. Then the MPU 41 determines drift amount dxy in the horizontal scanning direction x of Y image in the manner as described below. As shown in FIG. 17, when the diagonal mark MByr shifts upward (rear side) in the drawing, the position of middle point in the vertical scanning direction of the diagonal mark MByr detected by the optical sensor is anterior to the target position. On the other hand, when the image shifts downward (front side) of the drawing, the position of middle point in the vertical scanning direction of the diagonal mark MByr detected by the optical sensor is posterior to the target position. By determining drift amount dxy of the difference in middle point position of the perpendicular mark MAy and diagonal mark MBy, relative to the target (ideal) distance 4d+(L/2) cos 45°, it is possible to know the drift amount in the horizontal scanning direction.

First, as shown in Mathematical Equation 8, the MPU 41 calculates a drift amount of the difference in middle point position between the rear perpendicular mark MAyr and the diagonal mark MByr (Mfr to Mbr), relative to the reference value 4d+(L/2) cos 45° (see FIG. 5).

$$dxyr = (Mfr - Mbr) - \left(4d + \frac{L}{2}\cos 45°\right) \quad (8)$$

Next, as shown in Mathematical Equation 9, a drift amount of the difference in middle point position between the perpendicular mark MAyc and the diagonal mark MByc of center c (Mfc to Mbc), relative to the reference value 4d+(L/2) cos 45° (see FIG. 5) is calculated.

$$dxyc = (Mfc - Mbc) - \left(4d + \frac{L}{2}\cos 45°\right) \quad (9)$$

Next, as shown Mathematical Equation 10, a drift amount of the difference in middle point position between the perpendicular mark MAyf and the diagonal mark MByf of front part f (Mff to Mbf), relative to the reference value 4d+(L/2) cos 45° (see FIG. 5) is calculated.

$$dxyf = (Mff - Mbf) - \left(4d + \frac{L}{2}\cos 45°\right) \quad (10)$$

Then as shown in Mathematical Equation 11, by calculating an average value of drift amount of rear part r, drift amount of center part, and drift amount of front part, drift amount dxy in the horizontal scanning direction of Y image is calculated.

$$dxy=(dxyr+dxyc+dxyf)/3 \quad (11)$$

The value obtained by Mathematical Equation 11 is drift amount in the horizontal scanning direction dxy of Y image, and in the drift adjustment DAD as described later, the drift amount in the horizontal scanning direction is corrected based on the drift amount in the horizontal scanning direction dxy thus calculated.

Next, as shown in Mathematical Equation 12, the MPU 41 calculates a drift amount of horizontal scanning line length dLxy of Y image by subtracting skew dsqy from the difference in middle point position between the rear diagonal mark MByr and the front diagonal mark MByf (Mff to Mfr).

$$dLxy=(Mff-Mfr)-dsqy \quad (12)$$

The value obtained by Mathematical Equation 12 is a drift amount of horizontal scanning line length of Y image dLxy, and the length of the horizontal scanning line is corrected in the drift adjustment DAD as described later, based on the drift amount of horizontal scanning line length of Y image dLxy thus calculated.

The MPU 41 also calculates image formation drift amounts of the remaining C and M images (drift correction amounts dryc and drym in the vertical scanning direction y, drift correction amounts in the horizontal scanning direction y dxc and dxm, skew amounts dsqc and dsqm, and drift correction amounts of horizontal scanning line length dLxc and dLxm) in a similar manner as described above for calculation of image formation drift amount of Y image (Ace and Acm). The MPU 41 also calculates drift amounts of K image (drift amount in-the horizontal scanning direction x dxk, drift amount of the horizontal scanning line length dLxk), in the generally same manner as described for calculation of image formation drift amounts of Y image, however, in the present laser printer, since color matching in the vertical scanning direction y is based on K, as to K, calculation of positional drift correcting amount dRyk and skew amount dsqk in the vertical scanning direction is not executed (Ack).

Once drift amounts based on measurement data are calculated in the manner as described above, drift adjustment (DAD) shown in FIG. 9B is executed. First, drift amount adjustment (Ady) of Y color will be concretely explained.

First, adjustment of drift amount in the vertical scanning direction y will be explained. The drift amount in the vertical scanning direction y is adjusted by shifting the timing at which scanning to the Y color photoconductor of the optical writing unit 4 starts, from the reference (ideal) timing (y direction) by the amount that corresponds to the drift adjustment amount dRyy calculated above.

Next, adjustment of skew will be explained. A shown in FIGS. 4A and 4B, inclination of the scanning line of the lengthy lens unit 50 of the optical writing unit 4 is adjustable. The MPU 41 achieves adjustment by driving the driving motor 56 by the amount corresponding to the skew dsqy calculated above from the reference position of the driving motor 56.

Figure 18:
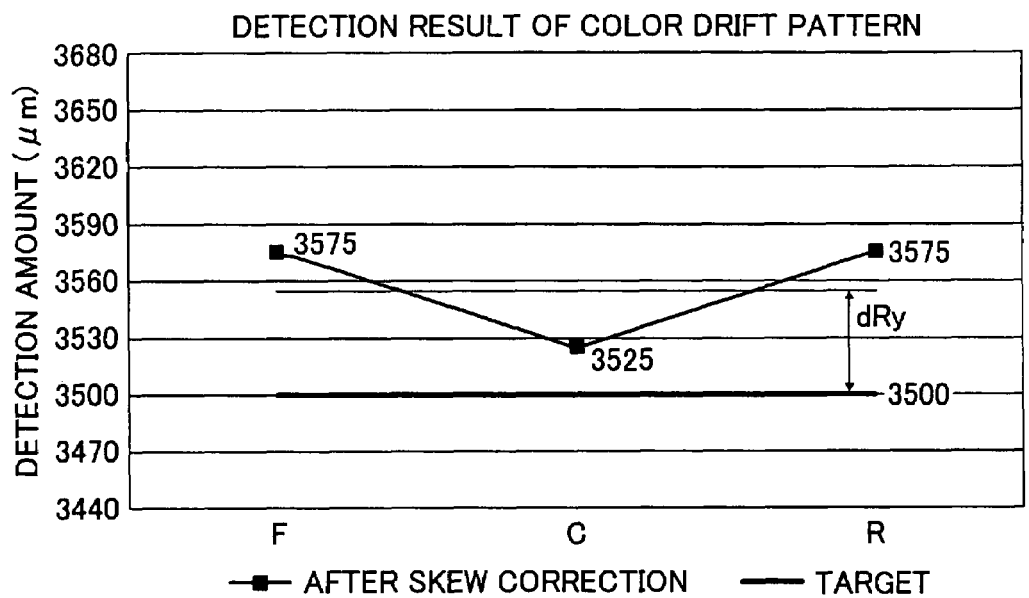
FIG. 18 is a view for explaining a positional drift from an ideal position after a skew is corrected.

FIG. 18 is a view for explaining a positional drift from an ideal position after a skew is corrected. FIG. 18 depicts drift amount of Y image, relative to K image after skew correction. The bold line in FIG. 18 represents target (ideal) image formation line formed at a pitch d (3.5 millimeters) with respect to the mark of K color. As shown in FIG. 18, by the skew correction, the position of rear part r formed later than the front part f shifts frontward by the skew amount dsqy as calculated by Mathematical Equation 7. On the other hand, the position of front part f is formed later by the skew amount dsqy by the skew correction. On the other hand, the position of center part c will not change even after execution of the skew correction. This is because the center of the lengthy lens will not change its position by skew adjustment since the lengthy lens unit 50 that conducts skew adjustment of the optical writing unit 4 according to the present embodiment conducts skew adjustment by swiveling about the supporting base 66. Accordingly, even when the positional drift correction in the vertical scanning direction is conducted based on the position for the reference color K in center part c that is calculated based on the detection result of mark-pattern for which skew is not corrected, the accuracy of positional drift correction will not be impaired. In addition, by calculating the skew correction amount and registration correction amount in the vertical scanning direction according to the calculation method as described above, it is possible to calculate the skew correction amount and the drift correction amount in the vertical scanning registration correction amount by data of one sampling. As a result, it is possible to rapidly conduct color drift correction of a full color machine, and to provide a convenient full color machine.

Figure 19:
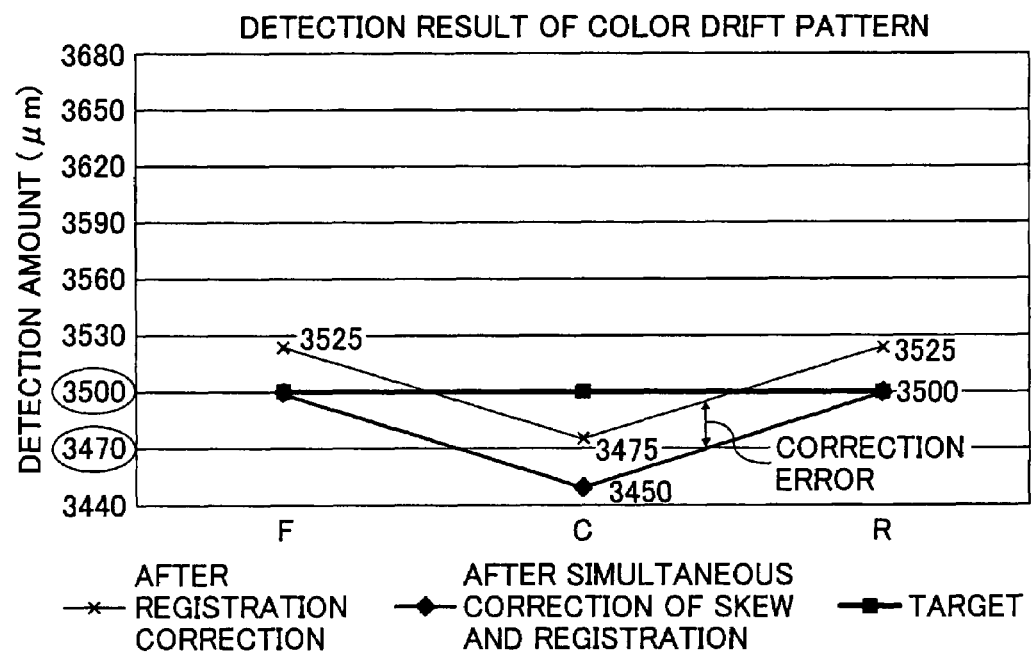
FIG. 19 is a view for explaining difference of the positional drift from the ideal position between that of conducted by a former color-drift-error correcting device and that of by the color-dirt-error correcting device of the embodiment.

FIG. 19 is a view for explaining difference of the positional drift from the ideal position between that of conducted by a former color-drift-error correcting device and that of by the color-dirt-error correcting device of the embodiment. FIG. 19 depicts drift amount of Y image, relative to K image after adjustment of skew and color drift (registration) in the vertical scanning direction y. The line segments plotted by ■ (solid square) in FIG. 19 represent the target (ideal) image formation line formed at a pitch d (3.5 millimeters) with respect to the mark of K color. The line segments plotted by x in the drawing represents an image formation line after color drift adjustment based on the drift correction amount in the vertical scanning direction calculated in consideration of the curve amount dcuy. Further, the line segments plotted by ♦ (solid diamond) in the drawing represent image formation line after adjustment of color drift adjustment based on the drift correction amount in the vertical scanning direction calculated only from the difference between the rear part r and the front part f in a conventional manner. As can be seen from the drawing, color drift correction in the vertical scanning direction executed in a conventional manner allows formation of images without color drift for k color for rear part r and front part f. However, it results in color drift of 50 [micrometers] for k color for the center part c. Therefore, such color drift occurring in the center part is visible. On the other hand, as to the image formation line adjusted by the color drift correction amount in the vertical scanning direction calculated in consideration of the curve amount dcu of the present embodiment, it intersects with the target (ideal) image formation line at two points, and color drift is corrected so that the target image formation line comes approximately in the center of the width of the vertical scanning direction of the image formation line. As a result, although color drifts relative to K color occur in any of the rear part r, center part c, and front part f, the color drift amounts are 25 [micrometers]. Since the color drift correction amount in the vertical scanning direction is calculated in consideration of the curve amount, the part where color drift is large is eliminated as is the case of the conventional technique. As a result, color drift is less conspicuous, and it is possible to obtain an image of high quality.

It goes without saying that when there is no curve in the image formation line, the image formation line adjusted according to the color correction amount in the vertical scanning direction calculated in consideration of the curve amount dcu of the present embodiment overlaps the target (ideal) image formation line, and will not intersect at two points. However, in usual conditions, the image formation line has a curve, and it intersects with the target (ideal) image formation line at two points when color drift correction is conducted in consideration of the curve amount dcu according to the present embodiment, so that color drift is inconspicuous, and an image of high quality can be obtained.

Figure 20:
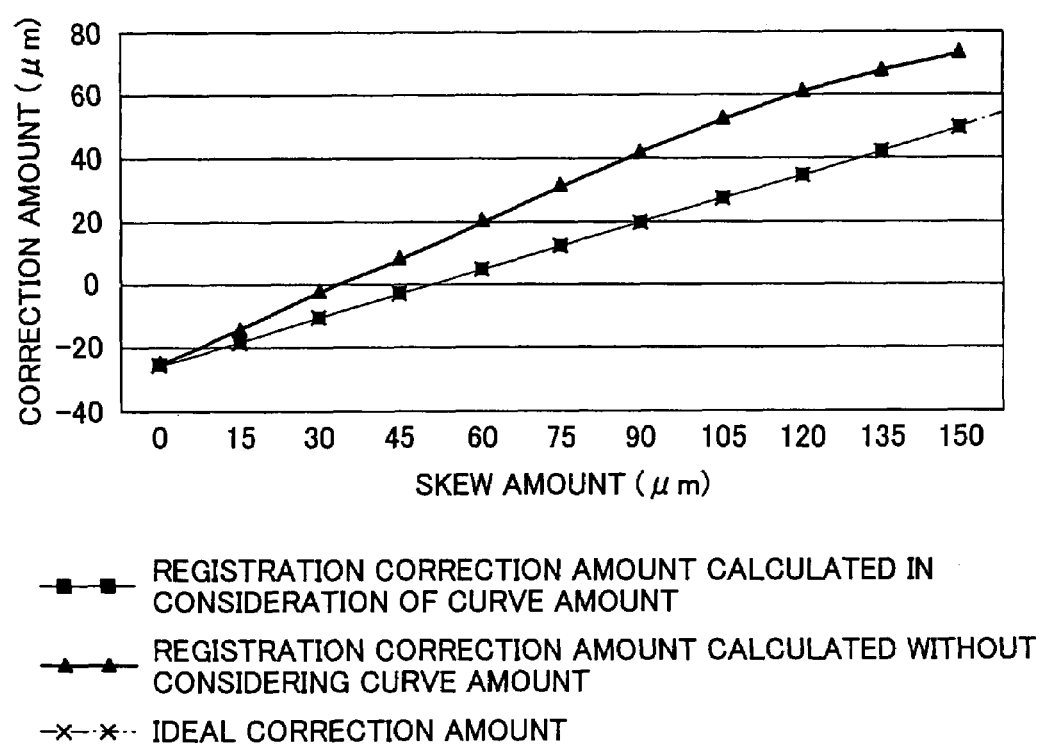
FIG. 20 is a view for explaining a registration correction amount calculated in consideration of a curving amount being compared to that of without consideration.

FIG. 20 is a view for explaining a registration correction amount calculated in consideration of a curving amount being compared to that of without consideration. FIG. 20 depicts a result of calculation of the positional drift (registration) correction length in the vertical scanning direction for the case where the distance from the perpendicular mark MAkr of reference color K in the front part f is shifted in the skew and vertical scanning direction so that it is the target distance d. The curve amount-dcu at this time is 50 [micrometers]. The line segments plotted by ▲ (solid triangle) in the drawing are such that the minimum value and the maximum value of the detection results (distance from the perpendicular mark MAkr of reference color K) of rear part r, center part c and front part f are averaged, and the value obtained by subtracting the target distance d from the average value is employed as a positional drift (registration) correction amount in the vertical scanning direction. On the other hand, the line segments plotted by ■ (solid square) in the drawing are such that the value calculated in consideration of the curve amount as shown in Mathematical Equation 3 is employed as a positional drift (registration) correction amount in the vertical scanning direction. The dashed-dotted line in the drawing represents the ideal positional drift (registration) correction amount in the vertical scanning direction when the drift amounts of center and both ends from the target position are the minimum of 25 [micrometers]. As can be seen from the drawing, when the positional drift (registration) correction amount in the vertical scanning direction is calculated in consideration of the curve amount, an ideal positional drift (registration) correction amount in the vertical scanning direction is realized even when the skew amount is large. On the other hand, when the minimum value and the maximum value of the detection results (distance from the perpendicular mark MAkr of reference color K) of rear part r, center part c, and front part f are averaged, and the value obtained by subtracting the target distance d from the average value is employed as a positional drift (registration) correction amount in the vertical scanning direction, the difference from the ideal positional drift (registration) correction amount in the vertical scanning direction increases as the skew amount increases, and color drift in both end parts or center part increases.

This reveals that calculation of the positional drift (registration) correction amount in the vertical scanning direction in consideration of the curve amount avoids increase in color drift even when larger skew amounts are large.

Next, in adjustment of horizontal scanning drift amount dxy, the MPU 41 sets the sending timing of image data of the top of line (x direction), to the modulator of the optical writing unit 4, with respect to the line synchronization signal representing the top of line in latent image formation by the laser beam La of the optical writing unit 4 while shifting it from the reference timing by the drift amount dxy that is calculated in the above.

In adjustment of drift amount of horizontal scanning line length dLxy, the MPU 41 sets the frequency of the pixel synchronization clock that allocates image data by pixel units to the horizontal scanning line on the photoconductor at reference frequency xLs/(Ls+dLxy). The Ls is reference line length. The MPU 41 adjusts the image drift amount of C and M in the same manner as described for adjustment of image formation drift of Y (Adc and Adm). As to K color, only adjustment of drift amount dxy in the horizontal scanning direction and adjustment of drift amount of horizontal scanning line length dLxy are conducted (Adk).

Figure 21:
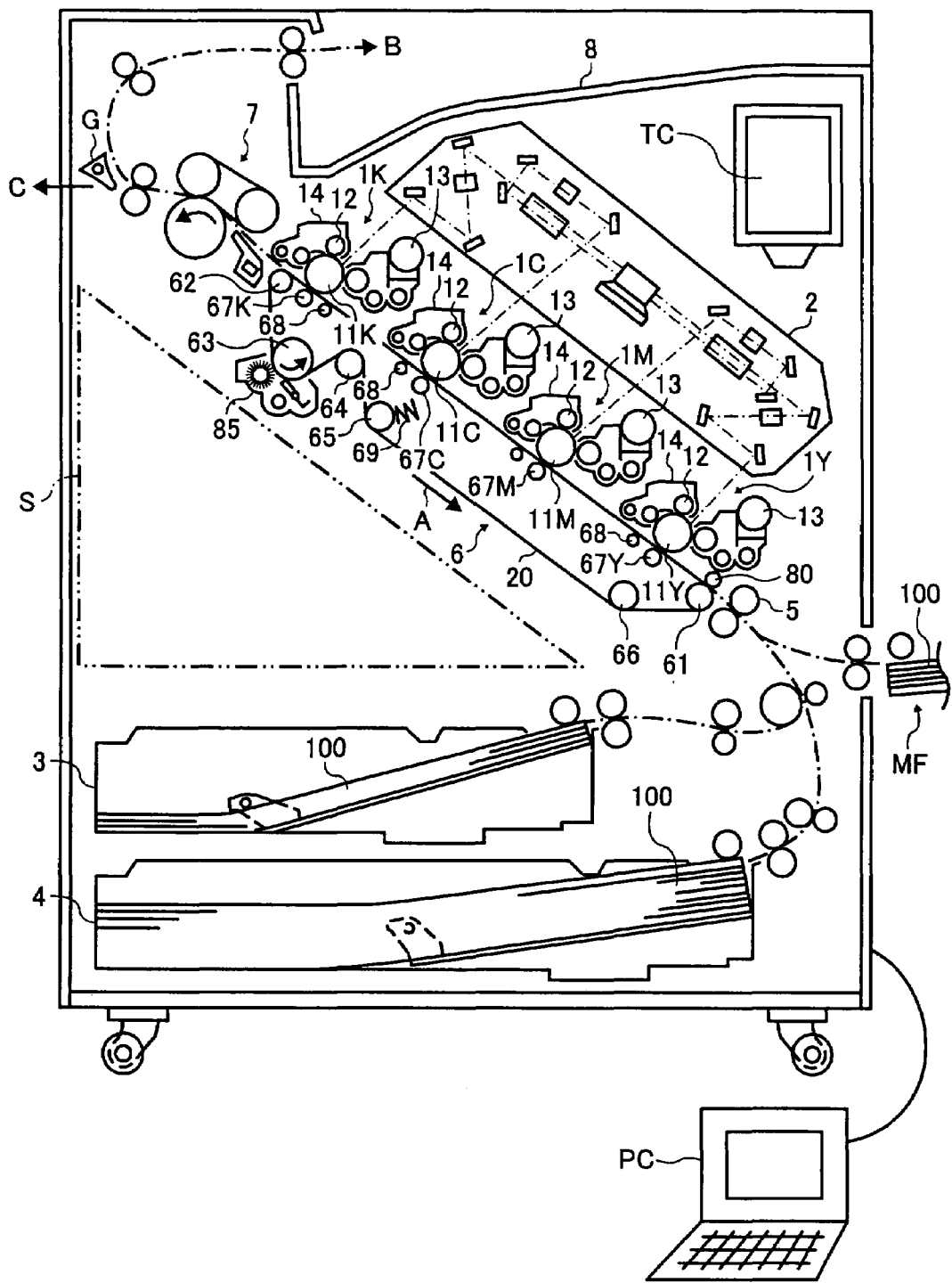
FIG. 21 is a view for explaining a direct transfer type image forming apparatus.
Figure 22:
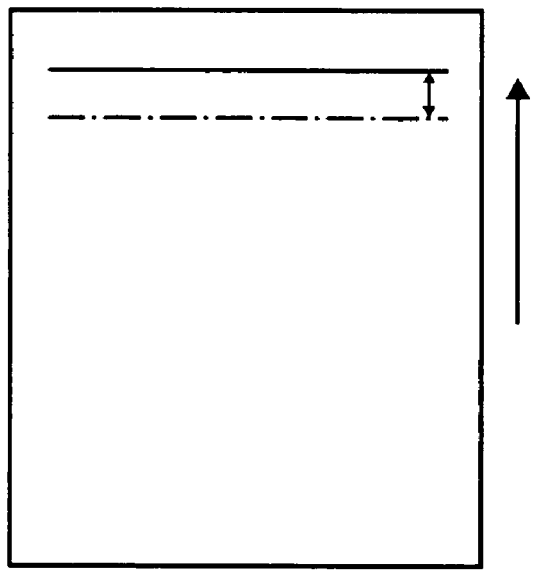
FIG. 22 is a view for explaining color drift in a vertical scanning direction.
Figure 23:
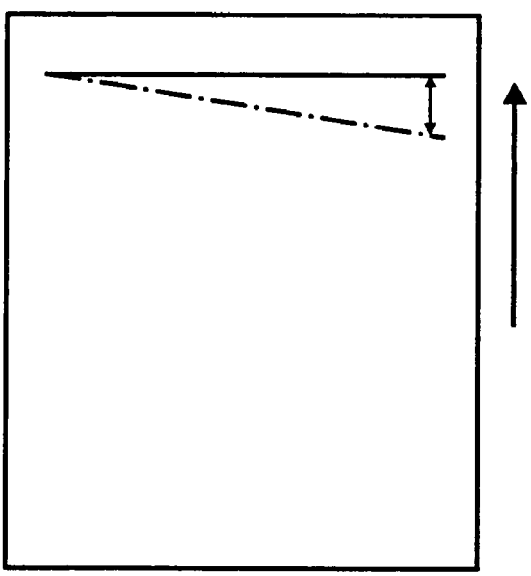
FIG. 23 is a view for explaining a skew drift.
Figure 24A:
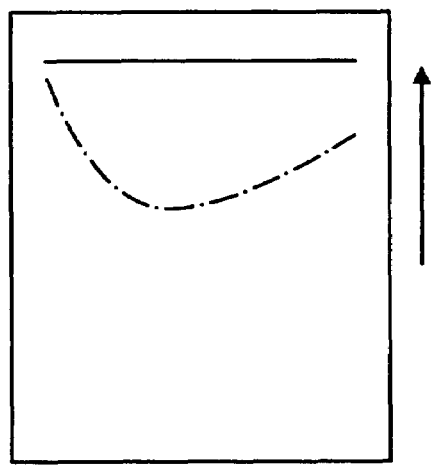
FIGS. 24A and 24B are views for explaining a curved color drift.
Figure 24B:
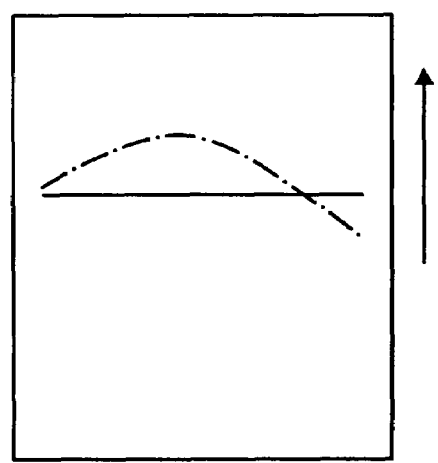
Figure 25:
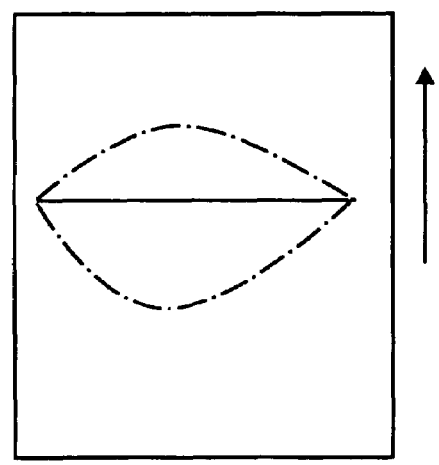
FIG. 25 is a view for explaining an amount of color drift compared to the ideal image after the color drift is corrected based on the former art.

FIG. 21 is a view for explaining a direct transfer type image forming apparatus. In the embodiment, explanation was made for the intermediate transfer type image forming apparatus in which on the intermediate transfer belt 20, four color toner images on the photoconductors 10Y, 10M, 10C, and 10K are superposed to form a full color image, and the resultant full color image is transferred to the transfer sheet, however, the present invention is not limited thereto. The direct transfer system as shown in FIG. 21, in which a transfer sheet is transferred by the transfer conveyance belt 20, and four color toner images on the charging devices 11Y, 11M, 11C, and 11K are superposed and transferred to transfer paper may be applied to the embodiment of the present invention. Also in such an image forming apparatus, a personal computer is connected, and color drift correction may be executed from the personal computer.

The calculation Equation of skew correction amount shown by Mathematical Equation 7 is applicable only when the supporting base 66 of the lengthy lens unit 50 that executes skew adjustment of the optical writing unit 4 lies in the center (the rotation center of the lengthy lens unit 50 lies in the center). Therefore, when the rotation center of the lengthy lens unit 50 is out of the center, appropriate skew correction amount cannot be calculated by Mathematical Equation 7. In the following, the manner in which appropriate skew correction amount can be calculated even when the rotation center of the lengthy lens unit 50 is out of the center will be explained.

Figure 26A:
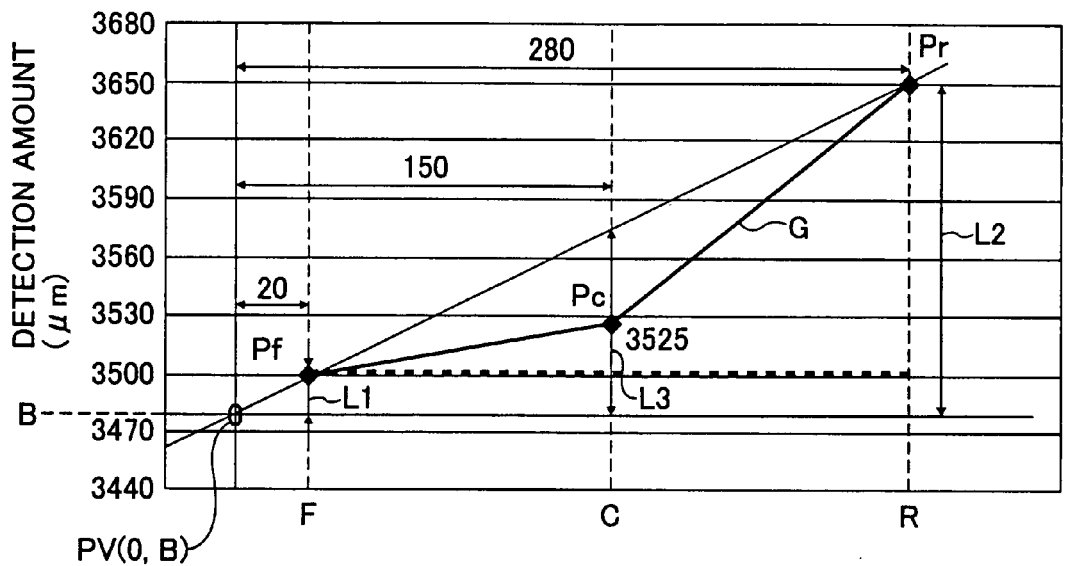
FIGS. 26A to 26D are views for explaining a correction of skew and drift in the vertical scanning direction (registration) according to a modified embodiment of the present invention.
Figure 26B:
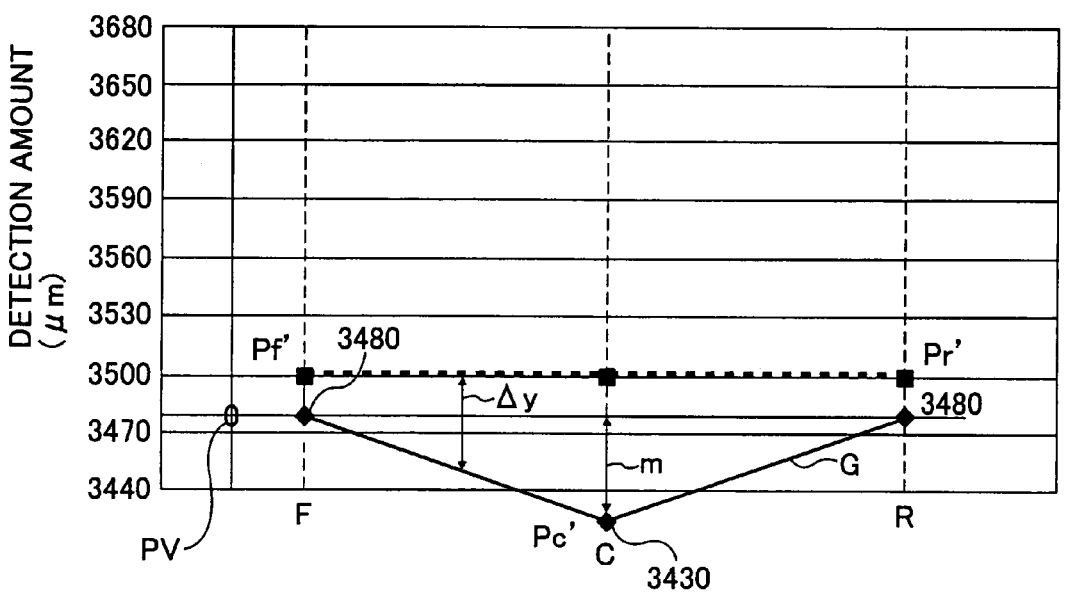
Figure 26C:
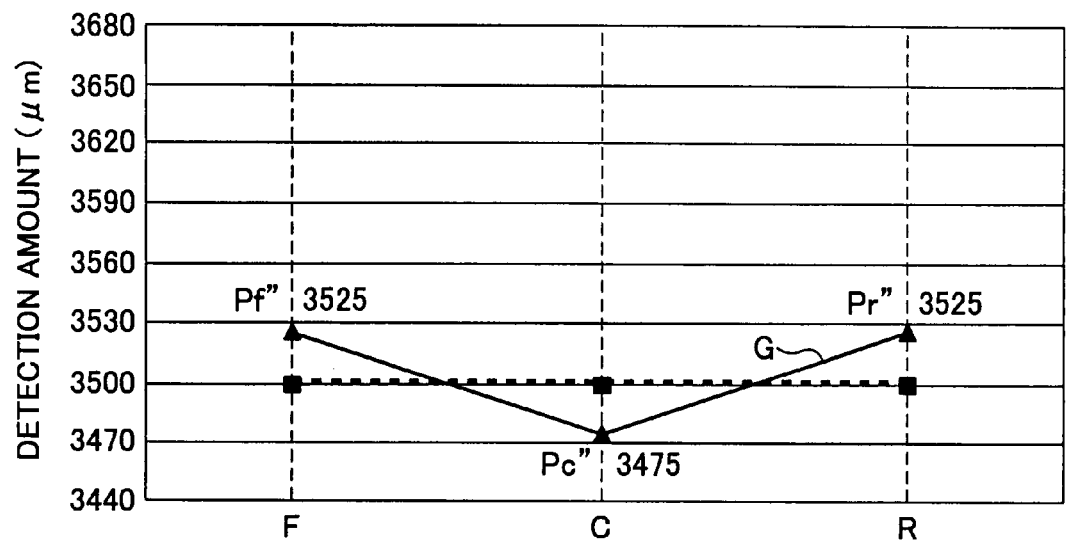
Figure 26D:
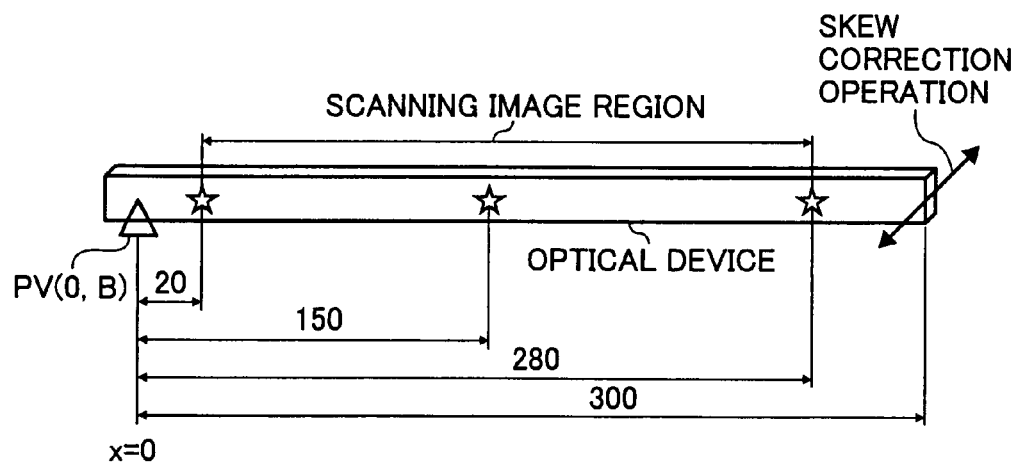

FIGS. 26A to 26D are views for explaining a correction of skew and drift in the vertical scanning direction (registration) according to a modified embodiment of the present invention. FIG. 26A depicts original data, FIG. 26B depicts provisional skew correction, FIG. 26C depicts final result, FIG. 26D depicts dimensional relation of the optical device (the lengthy lens unit 50). As shown in FIG. 26D, the supporting base 66 of the lengthy lens unit 50 is provided on the left in the drawing, and the lengthy lens unit 50 oscillates on the left of the drawing as its rotation center.

In FIG. 26D, the symbol m denotes curve amount dcu, L1 denotes correction amount at the position of x1, L2 denotes correction amount at the position of x2, L3 denotes correction amount at the position of x2, and $\Delta$ys denotes skew correction amount dsq. G denotes a curve, and P denotes a plot.

For calculation of skew correction amount dsq, distance and drift amount in the scanning direction is defined in the following manner based on the rotation center of the optical device (the lengthy lens unit 50) that conducts skew correction.

Defining the reading position of detector on either end of the posterior or anterior as x1, the drift amount of the read value, relative to the reference color pattern is defined as y1 (dyr or dyf).

Defining the reading position of detector on the other end as x2, the drift amount of the read value, relative to the reference color pattern is defined as y2 (dyr or dyf).

Defining the reading position of detector in the center as x3, the drift amount of the read value, relative to the reference color pattern is defined as y3 (dyc). The x coordinate of the rotation center is zero.

For calculation of skew correction amount in this case, taking the inclination of the straight line passing the coordinates (x1 and y1) and (x2, y2) as a skew amount, the optical device (the lengthy lens unit 50) is rotated such that when the straight line is Y=AX+B, the correction amount L1 is L1=y1−B at the position of x1, and the correction amount L2 is L2=y2−B at the position of x2, and after correction, the value of y at the positions of x1 and x2, namely y' is B. The value of B is y coordinate of rotation center, and is a known value which corresponds to the distance from the reference color, and is 3480 micrometers in the present embodiment.

When three rows are arranged at even intervals, the correction amount L3 at the position of x3 is eventually L3=(L1+L2)/2=(y1+y2)/2−B.

The positions after correction are y1'=y1−L1, y2'=y2−L2, and y3'=y3−L3, provided that y1'=y2'=B.

The curve amount dcu in this case is calculated in the following manner. Assuming that the correction with regard to the color drift detection amounts of three rows has completed, the curve amount dcu is calculated by dcu=y1'−y3'=B−y3+L3=B−y3+(y1+y2)/2−B=(y1+y2)/2−y3. Since y1 is dyr, y2 is dyf, and y3 is dyc, the curve amount can be obtained by a Equation similar to Mathematical Equation 3 regardless of the position of basis of rotation of the optical device.

Next, the vertical scanning registration correction amount dRy is calculated from the detection amount of color drift of three rows by dRy=d−(y1'−dcu/2)=d−(B−cu/2) (d is design distance (ideal distance), and is 3500 micrometers in this example).

Adjustment of skew is achieved by driving the driving motor of the optical device by the amount corresponding to the skew dsqy calculated in a similar manner as described above. It goes without saying that the amount of rotating the optical device (driving amount of driving motor) at this time is determined in advance by prophetical calculation and verification using an actual machine.

In the same manner as described above, the drift amount in the vertical scanning direction y is adjusted by shifting the timing at which scanning to the Y photoconductor of the optical writing unit 4 starts from the reference (ideal) timing (y direction) by the amount that corresponds to the drift adjustment amount dRyy calculated above.

In this manner, the final image position after skew adjustment and registration adjustment is 3525 micrometers for front and rear, and 3475 micrometers for center, and the final image position is identical to that shown in FIG. 19. Therefore, when such correction is conducted, ideal positional drift (registration) correction amount in the vertical scanning direction can be achieved even if the skew amount increases as shown in FIG. 20.

With such a calculation method, it is possible to simultaneously correct the skew and the vertical scanning registration, and bring the vertical scanning registration position into a desired position. Additionally, by conducting the calculation method, it is possible to simultaneously correct the skew and the vertical scanning registration and bring the vertical scanning registration position into the most desired position even when the basis of rotation of the optical device is not in the center. As a result, it is possible to rapidly conduct color drift correction in a full color machine and to provide a convenient full color machine.

Further, it is possible to make color drift inconspicuous by making two intersects with the target (ideal) image formation line through operation of skew correction and correction of registration (vertical scanning direction y) using different sampling data.

Figure 27A:
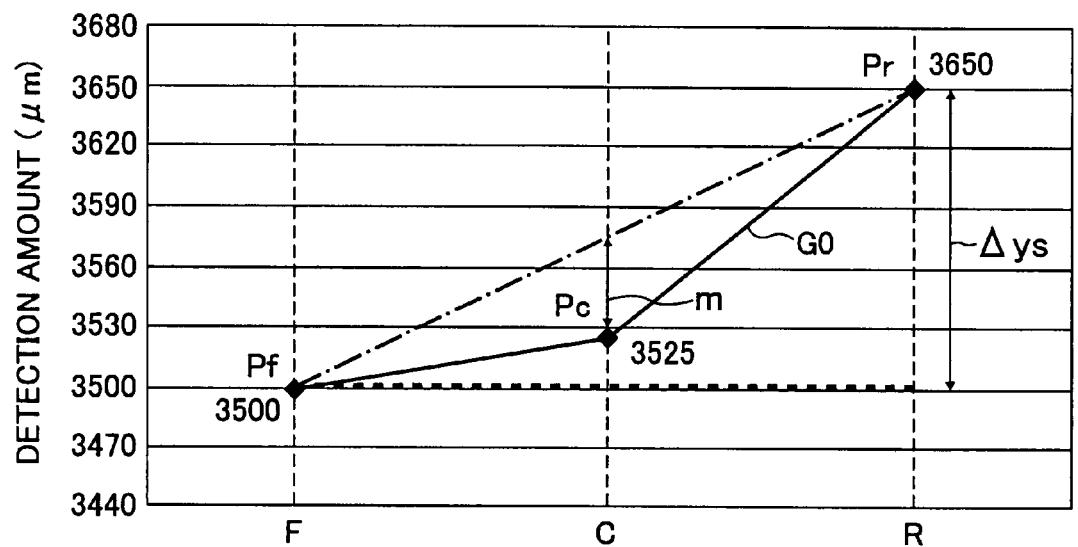
FIGS. 27A to 27C are views for explanation a correction of skew and drift in the vertical scanning direction (registration) according to another modified embodiment of the present invention.
Figure 27B:
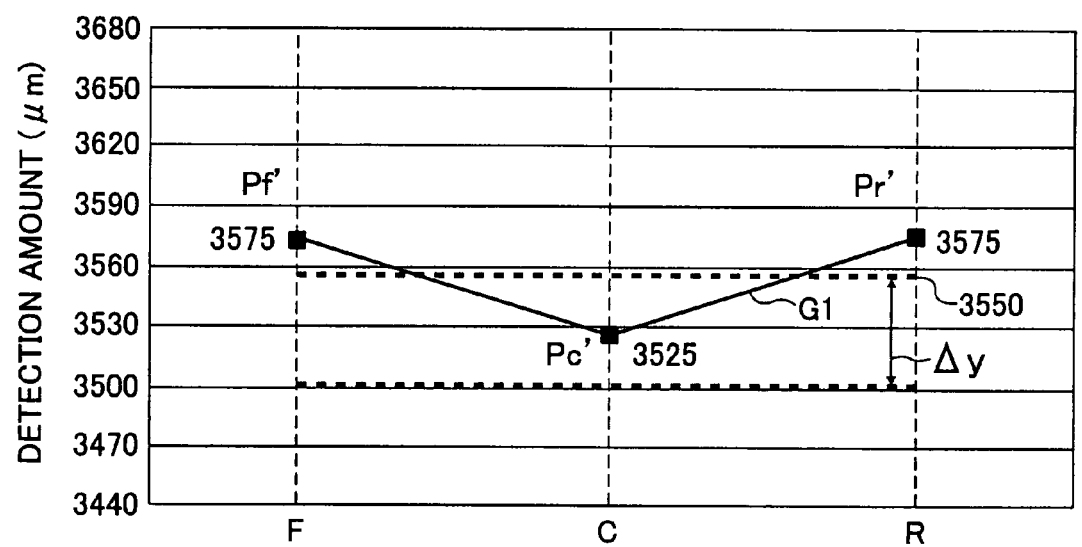
Figure 27C:
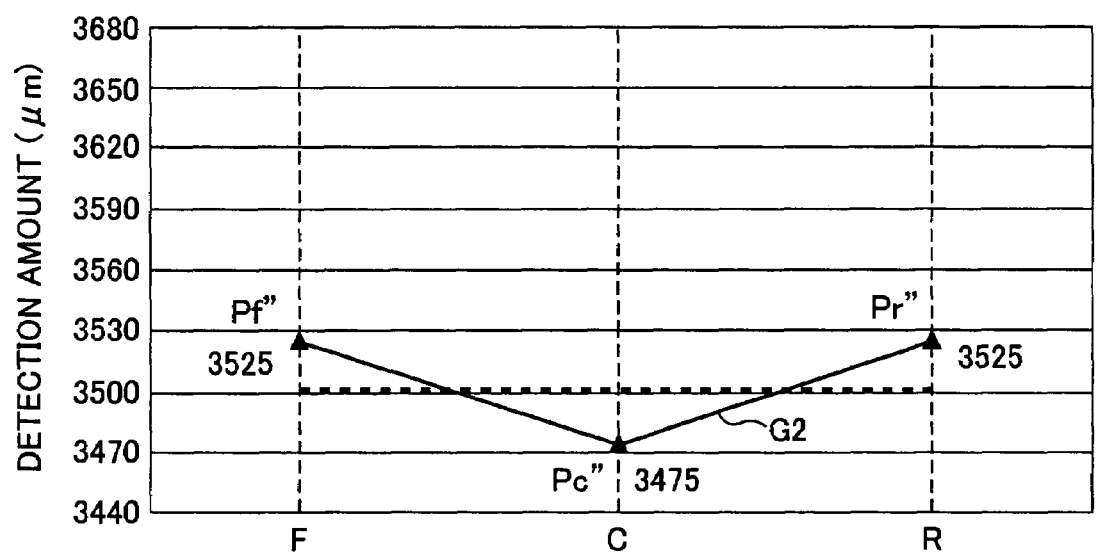

FIGS. 27A to 27C are views for explanation a correction of skew and drift in the vertical scanning direction (registration) according to another modified embodiment of the present invention. FIGS. 27A to 27C explain a correction procedure in which skew correction and registration correction are conducted using different sampling data. FIGS. 27A to 27C depict curves by FIG. 27A original data, FIG. 27B data after correction of skew and registration, and FIG. 27C data after further correction of registration.

In the drawings, m denotes curve amount dcu, $\Delta$y denotes registration correction amount dRy in the vertical scanning direction, and $\Delta$ys denotes skew correction amount dsq. Further, G denotes a curve, and P denotes a plot.

When skew and vertical scanning registration are corrected using different sampling data (3 rows drawing), skew correction amount $\Delta$ys is calculated from the condition of curve G0 in FIG. 27A, and only skew is corrected at first to the curve condition G1 in FIG. 27B. The difference (width) between the maximum value and the minimum value of the curve G1 is 50 micrometers, and the average thereof is 3550 micrometers. Next, color drift detection pattern is again described and detected from this condition, and correction amount is calculated. Since correction of skew has completed at this time, only registration error is detected. Based on the idea of minimizing the absolute value of error as described above, the average value of 3550 micrometers is matched to the designed target position, and hence the registration correction amount $\Delta$y is 50 micrometers.

Calculation of skew correction amount and calculation Equation of vertical scanning registration correction amount are as same as those described above.

Also with execution of such correction as shown in FIGS. 27A to 27C, skew correction can be effected even when the rotation center of the optical device (the lengthy lens unit 50) is not in approximately the center. Further, even when such correction is conducted, curve amount m of image formation line is obtained from the 3 rows of sampling data in the horizontal scanning direction, and registration correction in the vertical scanning direction y may be conducted based on the curve amount. As a result, it is possible to make correction in such a manner that the image formation line intersects with the ideal image formation line at two points, and regulate the color drift.

(1) According to the color-drift correcting method of the present embodiment, a part in the horizontal scanning direction of the image after color drift correction will not have large color drift even when the image formation line in the horizontal scanning direction curves.

(2) According to the color-drift correcting method of the present embodiment, based on the mark-pattern formed in different three parts along the horizontal scanning direction of the intermediate transfer belt which is a transfer medium, curve amount of the image formation line of the horizontal scanning direction is calculated, and based on the curve amount of the image formation line of the horizontal scanning direction, color drift (registration) in the vertical scanning direction is corrected. By correcting the image formation line of the horizontal scanning direction based on the curve amount, it is possible to conduct color drift correction of the vertical scanning direction in such a manner that the image formation line of the horizontal scanning direction after correction intersects with the ideal image formation line for the reference color K at two points.

(3) By using Mathematical Equation 3, it is possible to calculate curve amount dcu of the image formation line for the reference color K from the mark-patterns formed at different three parts in the horizontal scanning direction of the intermediate transfer belt.

(4) Further, since the color drift correction amount dRy in the vertical scanning direction is calculated based on the curve amount dcu of the image formation line as shown by Mathematical Equation 4, it is possible to execute color drift correction of the vertical scanning direction in such a manner that the image formation line in the horizontal scanning direction after correction intersects with the ideal image formation line for the reference color K at two points. Further, by correcting color drift of the vertical scanning direction with a value calculated by Mathematical Equation 4, it is possible to position the ideal image formation line in the middle point between the most upstream part and the most downstream part in the transfer medium traveling direction of the image formation line curving in the vertical scanning direction. As a result, the positional drift of the curved image formation line from the image formation line is best controlled in the horizontal scanning direction.

(5) Further, as shown in FIGS. 4A and 4B, the lengthy lens unit 50 which is an optical device is allowed to oscillate the supporting base 66 provided in the center part of the vertical scanning direction as its supporting point. As a result, even when skew correction is conducted by oscillating the lengthy lens unit 50 by a certain amount based on the skew correction amount calculated by Mathematical Equation 7, the supporting point or the center part of the lengthy lens unit 50 will not move. Therefore, even when skew correction is conducted, the curve amount of the image formation line will not vary. As a result, it is possible to desirably conduct color drift correction of the vertical scanning direction based on the curve amount calculated by Mathematical Equation 3.

(6) Further, calculation of the correction amount of skew correction may be achieved in the following manner. Defining the position in the horizontal scanning direction of the detector for detecting a mark image located on either end of the posterior or anterior side as x1, the distance in the vertical scanning direction from the mark image of K color which is the reference color to the mark image of the color for which the skew correction amount is to be calculated as y1, the position in the horizontal scanning direction of the detector for detecting a mark image located on the other end as x2, the distance in the vertical scanning direction from the mark image of K color to the mark image of the color for which the skew correction amount is to be calculated as y2, the position in the horizontal scanning direction of the detector for detecting a mark image located in the center part as x3, and the distance in the vertical scanning direction from the mark image of K color to the mark image of the color for which the skew correction amount is to be calculated as y3, on the basis of the coordinates of rotation center of the optical device (0, B), the lengthy lens is rotated so that skew correction amount with respect to the position x1 is y1−B, and skew correction amount with respect to the position x2 is y2−B. As a result, it is possible to desirably correct skew of the image regardless of the position of the rotation center of the lengthy lens.

(7) Even when the color drift correction amount dRy in the vertical scanning direction is calculated by the Equation of dRy=d−(B−dcu/2), it is possible to conduct color drift correction in the vertical scanning direction so that two intersections are made with respect to the ideal image formation line of reference color K. Therefore, it is possible to position the ideal image formation line in the middle point between the most upstream part and the most downstream part in the transfer medium traveling direction of the image formation line curving in the vertical scanning direction. As a result, the positional drift of the curved image formation line from the image formation line is best controlled in the horizontal scanning direction.

(8) Further, the mark-patterns are formed on the intermediate transfer belt, and variation in belt velocity or the like occurs in the intermediate transfer belt due to eccentricity of driving roller, thickness of belt and the like. Accordingly, such variable component of belt velocity is involved into the distance in the vertical scanning direction from the mark image of reference color to the mark image of the color for which drift amount in the vertical scanning direction is to be determined, and erroneous curve amount may be obtained in calculation. For addressing this, a plurality of (eight) mark-patterns are formed in the vertical scanning direction; and a distance in the vertical scanning direction from the mark image of reference color of each mark-pattern to the mark image of the color for which drift amount in the vertical scanning direction is to be determined is determined. By averaging distances in the vertical scanning direction from the mark image of reference color to the mark image of the color for which drift amount in the vertical scanning direction is to be determined, that are determined for each mark-pattern, it is possible to eliminate the variation in belt velocity. As a result, it is possible to calculate the drift amount in the vertical scanning direction with high accuracy.

(9) Further, by conducting color drift correction in the vertical scanning direction and skew correction based on the same detection result, it is possible to reduce the time required for color drift correction compared to the case where first a mark-pattern is formed to conduct skew correction, and then a mark-pattern is formed again to correct color drift (registration) in the vertical scanning direction.

(10) Further, according to the image forming apparatus of the present embodiment, since correction of positional drift is conducted using the correcting method of positional drift having the features of the above (1) to (9), it is possible to obtain an image of high quality without color drift.

(9) Further, by applying the color-drift correcting method to a quadra-tandem system, it is possible to obtain an image of high quality without color drift.

(11) Further, in the case of an image forming apparatus of intermediate transfer system has an intermediate transfer belt, it is possible to achieve correction of color drift by forming mark-patterns on the intermediate transfer belt. In the case of an image forming apparatus of direct transfer system has a paper conveyance belt, it is possible to achieve correction of color drift by forming mark-patterns on the paper conveyance belt.

(12) Furthermore, since correction of color drift is enabled to be executed in response to an instruction signal from an operation panel, and a personal computer connected to the apparatus, a user is allowed to execute correction of color drift as is desired.

According to the embodiment of the present invention, mark-patterns are formed in equal to more than three parts on a transfer medium. Therefore, by forming mark-patterns in at least both ends and a center part of image formation area, it is possible to detect a curve condition of image formation line in the horizontal scanning direction from detection results of the mark-patterns. As a result, based on the curve condition of the image formation line in the horizontal scanning direction detected from the mark-patterns, it is possible to conduct color drift correction in the vertical scanning direction so that the image formation line in the horizontal scanning direction after correction interests with the ideal image formation line for the reference color at two points. Through such correction, the ideal image formation line is situated between the most upstream part and the most downstream part in the traveling direction of the transfer medium of the image formation line curving in the vertical scanning direction. As a result, both the most upstream part and the most downstream part in the traveling direction of the transfer medium of the image formation line will not be largely deviated from the ideal image formation line, compared to the case where both ends of the image formation line in the horizontal scanning direction are matched with an ideal image formation line. As a result, a part in the horizontal scanning direction of the image after color drift correction will not have large color drift from the reference color, and hence a high quality image is obtained.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A color-drift correcting method of forming a plurality of images of different colors and superposing the images onto a transfer medium, the method comprising:
    forming at least three mark-patterns at respectively different portions on the transfer medium in a main scanning direction, each mark-pattern including a plurality of images of different colors, the colors including one reference color, at least one image oriented parallel to the main scanning direction, and at least one image oriented at an angle with respect to the main scanning direction;
    detecting positions of the images in the mark-patterns;
    calculating, for each mark-pattern, each color-drift amount of the images in the corresponding mark-pattern relative to a reference color image in the corresponding mark-pattern when each color image is assumed to be superposed on the transfer medium;
    first color-drift correcting that corrects the color-drift amount in a sub scanning direction and a skew relative to the reference color image being based on each color-drift amount so as to decide a corrected-image line as a virtual image line for each color; and
    second color-drift correcting that corrects the color-drift amount in the sub scanning direction so that the virtual image lines corresponding to each of the colors other than the reference color intersect with the virtual image line of the reference color at at least two points.

2. The color-drift correcting method according to claim 1, further comprising calculating a curving-amount of each virtual image line relative to that of the reference color based on the color-drift amounts, the curving-amount representing an extent of curvature thereof, wherein
    the second color-drift correcting includes correcting the color-drift based on the curving-amount.

3. The color-drift correcting method according to claim 2, wherein
    the forming includes forming the mark-patterns at at least in a center part, a first end part, and a second end part of the transfer media in the main scanning direction, and
    the curving amount is defined by Equation (1)

$$dcu = \frac{dyr + dyf}{2} - dyc \qquad (1)$$

where dyc, dyr, and dyf are distances from the center part, the first end part, and the second end part of the virtual image lines to respectively the same parts of the virtual image line of the reference color.

4. The color-drift correcting method according to claim 3, wherein the second color-drift correcting includes correcting an amount of dRy relative to the virtual image line of the reference color represented by Equation (2)

$$dRy = \frac{dyr + dyf}{2} - D - \frac{dcu}{2} \qquad (2)$$
$$= \left[ \left( \frac{dyr + dyf}{2} + dyc \right) \bigg/ 2 \right] - D$$

where D is an ideal distance between the virtual image lines and the virtual image line of the reference color.

5. The color-drift correcting method according to claim 4, wherein
    the forming includes forming the mark-patterns by a plurality of image forming units, each image forming unit including an image carrier, and an optical writing unit that forms a latent image on a surface of the image carrier, the optical writing unit including an optical device attached thereto so as to oscillate, and
    the second color-drift correcting includes correcting the color-drift amount of dRy using dRy=D−(B−dcu/2), in which the coordinates of rotation center of the optical device is (0, B).

6. The color-drift correcting method according to claim 1, wherein
    the forming includes forming the mark-patterns by a plurality of image forming units, each image forming unit including an image carrier, and an optical writing unit that forms a latent image on a surface of the image carrier, the optical writing unit including an optical device attached thereto so as to oscillate about a near-center point in a length direction of the optical device as a rotating center, and the first color-correcting includes correcting the skew by causing the optical device to oscillate by a predetermined amount being based on the color-drift amount.

7. The color-drift correcting method according to claim 1, wherein the forming includes forming the mark-patterns by a plurality of image forming units, each image forming unit including an image carrier, and an optical writing unit that forms a latent image on a surface of the image carrier, the optical writing unit including an optical device attached thereto so as to oscillate, and the first color-drift correcting includes correcting the skew by rotating the optical device so that a skew correction amount with respect to the position x1 is y1-B, and a skew correction amount with respect to a position x2 is y2-B, where x1 is the position in the main scanning direction of a detector for detecting a mark image located on either end of a posterior or anterior side;

y1 represents a distance in the sub scanning direction from a mark image of the reference color formed in one end part the main scanning direction of the transfer medium to a mark image of the color for which the skew correction amount is to be calculated;

x2 is a position in the main scanning direction of the detector for detecting a mark image located on the other end;

y2 is a distance in the sub scanning direction from a mark image of reference color formed in the other end part in the main scanning direction of the transfer medium to a mark image of the color for which the skew correction amount is to be calculated, in which the coordinates of rotation center of the optical device is (0, B).

8. The color-drift correcting method according to claim 1, wherein the second-color drift correcting includes correcting the color-drift amount being based on an average distance between each virtual image line of the colors other than the reference color and the image line of the reference color.

9. The color-drift correcting method according to claim 1, wherein the first color-drift correcting and the second color-drift correcting include correcting each color-drift amount based on the same calculated color-drift amount.

10. An image forming apparatus of forming a plurality of images of different colors and superposing the images onto a transfer medium, the apparatus comprising:

at least three mark-pattern forming unit at respectively different portions on the transfer medium in a main scanning direction, each mark-pattern including a plurality of images of different colors, the colors including one reference color, at least one image oriented parallel to the main scanning direction, and at least one image oriented at an angle with respect to the main scanning direction;

a detecting unit that detects positions of the images in the mark-patterns;

a calculating unit that calculates, for each mark-pattern, each color-drift amount of the images in the corresponding mark-pattern relative to a reference color in the corresponding mark-pattern when each color image is assumed to be superposed on the transfer medium; and a controller that performs first color-drift correcting that corrects the color-drift amount in a sub scanning direction and a skew relative to the reference color image being based on each color-drift amount so as to decide a corrected-image line as a virtual image line for each color; and second color-drift correcting that corrects the color-drift amount in the sub scanning direction so that the virtual image lines corresponding to each of the colors other than the reference color intersect with the virtual image line of the reference color at at least two points.

11. The image forming apparatus according to claim 10, wherein the image forming apparatus is of quadra-tandem system that form images of four different colors.

12. The image forming apparatus according to claim 10, wherein the image forming apparatus includes the transfer medium that is any one of an intermediate transfer belt and a paper conveyance belt.

13. The image forming apparatus according to claim 10, wherein the controller is operated by an instruction signal from any one of an operation panel and a personal computer connected thereto.

* * * * *